(12) United States Patent
Fujioka et al.

(10) Patent No.: US 12,368,163 B2
(45) Date of Patent: Jul. 22, 2025

(54) HARDLY GRAPHITIZABLE CARBONACEOUS MATERIAL FOR NONAQUEOUS ELECTROLYTE SECONDARY BATTERIES FULLY CHARGED TO BE USED, METHOD FOR PRODUCING SAME, NEGATIVE ELECTRODE MATERIAL FOR NONAQUEOUS ELECTROLYTE SECONDARY BATTERIES, AND NONAQUEOUS ELECTROLYTE SECONDARY BATTERY FULLY CHARGED TO BE USED

(71) Applicant: KURARAY CO., LTD., Kurashiki (JP)

(72) Inventors: Junji Fujioka, Kurashiki (JP);
Jun-Sang Cho, Kurashiki (JP);
Taketoshi Okuno, Kurashiki (JP);
Hideharu Iwasaki, Kurashiki (JP)

(73) Assignee: KURARAY CO., LTD., Kurashiki (JP)

( * ) Notice: Subject to any disclaimer, the term of this patent is extended or adjusted under 35 U.S.C. 154(b) by 199 days.

(21) Appl. No.: 18/075,990

(22) Filed: Dec. 6, 2022

(65) Prior Publication Data

US 2023/0113201 A1 Apr. 13, 2023

Related U.S. Application Data

(62) Division of application No. 15/749,972, filed as application No. PCT/JP2016/071266 on Jul. 20, 2016, now abandoned.

(30) Foreign Application Priority Data

Aug. 5, 2015 (JP) ................................. 2015-155168

(51) Int. Cl.
*H01M 4/587* (2010.01)
*H01M 4/02* (2006.01)
(Continued)

(52) U.S. Cl.
CPC ........... *H01M 4/587* (2013.01); *H01M 4/133* (2013.01); *H01M 4/525* (2013.01);
(Continued)

(58) Field of Classification Search
CPC .............................. H01M 4/133; H01M 4/587
See application file for complete search history.

(56) References Cited

U.S. PATENT DOCUMENTS

| 6,156,457 A | 12/2000 | Takami et al. |
| 6,303,249 B1 | 10/2001 | Sonobe et al. |
| (Continued) | | |

FOREIGN PATENT DOCUMENTS

| EP | 0 767 505 A1 | 4/1997 |
| EP | 2 892 096 A1 | 7/2015 |
| (Continued) | | |

OTHER PUBLICATIONS

International Search Report issued Oct. 25, 2016, in PCT/JP2016/071266 filed Jul. 20, 2016.
(Continued)

*Primary Examiner* — Stephan J Essex
(74) *Attorney, Agent, or Firm* — Oblon, McClelland, Maier & Neustadt, L.L.P.

(57) ABSTRACT

A hardly graphitizable carbonaceous material can be used in a negative electrode material for nonaqueous electrolyte secondary batteries (for example, a lithium ion battery) having not only high charge capacity but also high charge-discharge efficiency and being fully charged to be used and a method for producing the same. Such hardly graphitizable carbonaceous material may have an oxygen element content of 0.25% by mass or less.

20 Claims, 1 Drawing Sheet

(51) Int. Cl.
  *H01M 4/133* (2010.01)
  *H01M 4/525* (2010.01)
  *H01M 10/052* (2010.01)
  *H01M 10/0525* (2010.01)
  *H01M 10/058* (2010.01)

(52) U.S. Cl.
  CPC ..... *H01M 10/052* (2013.01); *H01M 10/0525* (2013.01); *H01M 10/058* (2013.01); *H01M 2004/021* (2013.01); *Y02E 60/10* (2013.01); *Y02T 10/70* (2013.01)

(56) References Cited

U.S. PATENT DOCUMENTS

| | | |
|---|---|---|
| 6,632,572 B1 | 10/2003 | Takahashi et al. |
| 2014/0065486 A1* | 3/2014 | Ono ................ H01M 4/366 429/231.4 |
| 2015/0024277 A1 | 1/2015 | Komatsu et al. |
| 2015/0221948 A1 | 8/2015 | Komatsu et al. |
| 2015/0263347 A1 | 9/2015 | Imaji et al. |
| 2016/0254520 A1 | 9/2016 | Okuda et al. |

FOREIGN PATENT DOCUMENTS

| | | |
|---|---|---|
| EP | 2 894 701 A1 | 7/2015 |
| JP | 9-161801 A | 6/1997 |
| JP | 10-21919 A | 1/1998 |
| JP | 10-312807 A | 11/1998 |
| JP | 2001-15155 4 | 1/2001 |
| JP | 2007042571 A * | 2/2007 |
| JP | 2015-65154 A | 4/2015 |
| JP | 2015-88354 A | 5/2015 |
| JP | 2015-94710 A | 5/2015 |
| JP | 2015-179666 A | 10/2015 |
| JP | 2016-152222 A | 8/2016 |
| WO | 2014/034857 A1 | 3/2001 |
| WO | 2013/118757 A1 | 8/2013 |

OTHER PUBLICATIONS

English translation of the International Preliminary Report on Patentability and Written Opinion issued Feb. 15, 2018 in PCT/JP2016/071266.

Extended European Search Report issued Feb. 18, 2019 in Patent Application No. 16832765.8.

Office Action issued Jan. 12, 2021 in corresponding Japanese Patent Application No. 2017-532481 (with machine-generated English translation), 15 pages.

* cited by examiner

HARDLY GRAPHITIZABLE CARBONACEOUS MATERIAL FOR NONAQUEOUS ELECTROLYTE SECONDARY BATTERIES FULLY CHARGED TO BE USED, METHOD FOR PRODUCING SAME, NEGATIVE ELECTRODE MATERIAL FOR NONAQUEOUS ELECTROLYTE SECONDARY BATTERIES, AND NONAQUEOUS ELECTROLYTE SECONDARY BATTERY FULLY CHARGED TO BE USED

CROSS-REFERENCE TO RELATED APPLICATIONS

The present application is a division of U.S. application Ser. No. 15/749,972, published as US 2018/0233749 A1, which was the national stage of international application PCT/JP2016/071266, filed on Jul. 20, 2016, claiming the benefit of the filing date of Japanese Appl. No. 2015-155168, filed on Aug. 5, 2015, the content of each of which is incorporated by reference.

TECHNICAL FIELD

The present invention relates to a hardly graphitizable carbonaceous material suitable as a negative electrode material for nonaqueous electrolyte secondary batteries (for example, a lithium ion secondary battery) fully charged to be used and a method for producing the same, a negative electrode material for nonaqueous electrolyte secondary batteries, and a nonaqueous electrolyte secondary battery fully charged to be used.

BACKGROUND ART

The lithium ion secondary battery has hitherto been widely used for small mobile equipment such as a mobile phone and a notebook personal computer. A hardly graphitizable carbonaceous material has been developed as a negative electrode material for lithium ion secondary batteries (Patent Document 1) and has also been used therefor because the hardly graphitizable carbonaceous material is capable of doping (charging) and dedoping (discharging) of lithium in an amount more than 372 mAh/g being the theoretical capacity of graphite and is also excellent in input-output characteristics, cycle durability, and low-temperature properties.

The hardly graphitizable carbonaceous material can be obtained from carbon sources such as petroleum pitch, coal pitch, phenol resins, and plants. Of these carbon sources, plants have been attracting attention because plants are raw materials that can be cultivated to be sustainedly stably supplied and are available inexpensively. Moreover, satisfactory charge-discharge capacity is expected because there are many fine pores in a carbonaceous material obtained by calcining a carbon raw material originating from plants (for example, Patent Document 1 and Patent Document 2).

When a lithium ion secondary battery goes through a fully charged state into an overcharged state during charging, many lithium ions are generated by a reaction at a positive electrode, a negative electrode becomes difficult to hold lithium ions, metallic lithium is precipitated on a surface of the negative electrode, and thermal stability of the lithium ion secondary battery is lowered as well as a decomposition reaction of a solvent is caused and the temperature of the lithium ion secondary battery is elevated. Accordingly, usually, for example, a current breaking device is adopted or a small amount of an aromatic compound as an additive is added to the electrolytic solution (for example, Patent Document 3 and Patent Document 4) to secure the safety against overcharging. On the other hand, in order to more surely secure the safety, charging of a lithium ion secondary battery is usually performed by a method (constant-current constant-voltage method) in which constant-current charging is performed (for example, at 0.5 mA/cm$^2$) until the electrical potential of a negative electrode terminal based on that of metallic lithium becomes a predetermined electrical potential of 0 mV or more, constant-voltage charging is performed after the electrical potential of the negative electrode terminal reached the predetermined electrical potential, and charging is completed when the current value is kept at a constant value (for example, at 20 μA) during a predetermined period of time. In this case, practically, the lithium ion secondary battery is not charged to be in a fully charged state even when there is still space to hold lithium ions in the negative electrode.

On the other hand, in recent years, there is a growing concern for the environment, the development of a lithium ion secondary battery in the field of on-vehicle batteries has been advanced, and such a battery has been put into practical use. Therefore, a hardly graphitizable carbonaceous material with which a lithium ion battery having not only higher charge capacity but also higher charge-discharge efficiency can be produced has been desired.

PRIOR ART DOCUMENTS

Patent Documents

Patent Document 1: JP-A-H9-161801
Patent Document 2: JP-A-H10-21919
Patent Document 3: JP-A-2015-88354
Patent Document 4: JP-A-2001-15155

SUMMARY OF THE INVENTION

Problems to be Solved by the Invention

One object of the present invention is to provide a hardly graphitizable carbonaceous material used in a negative electrode material for nonaqueous electrolyte secondary batteries (for example, a lithium ion battery) having not only high charge capacity but also high charge-discharge efficiency and being fully charged to be used and a method for producing the same. Another object of the present invention is to provide a negative electrode material for nonaqueous electrolyte secondary batteries comprising such a hardly graphitizable carbonaceous material, and a nonaqueous electrolyte secondary battery comprising such a negative electrode material for nonaqueous electrolyte secondary batteries and being fully charged to be used.

Solutions to the Problems

As a result of extensive researches, the present inventors have found out that the above-mentioned problems can be solved by using a hardly graphitizable carbonaceous material having an oxygen element content within a specific range in a negative electrode material for nonaqueous electrolyte secondary batteries fully charged to be used, and thus, the present invention has been completed.

That is, the present invention includes the following preferred embodiments.

[1] A hardly graphitizable carbonaceous material being a hardly graphitizable carbonaceous material for nonaqueous electrolyte secondary batteries fully charged to be used and having an oxygen element content of 0.25% by mass or less.

[2] The hardly graphitizable carbonaceous material according to [1] mentioned above, wherein, when being taken out of a nonaqueous electrolyte secondary battery in a fully charged state, a main resonance peak position of a chemical shift value observed by $^7$Li nuclear-solid state NMR analysis is downfield by more than 115 ppm from a peak position of lithium chloride.

[3] The hardly graphitizable carbonaceous material according to [1] or [2] mentioned above, being derived from a carbon precursor originating from plants.

[4] The hardly graphitizable carbonaceous material according to any one of [1] to [3] mentioned above, further having an average face-to-face dimension $d_{002}$ of the (002) face calculated from the Bragg equation by a wide angle X-ray diffraction method of 0.36 to 0.42 nm.

[5] The hardly graphitizable carbonaceous material according to any one of [1] to [4] mentioned above, further having a specific surface area determined by a nitrogen adsorption BET three-point method of 1 to 20 m$^2$/g.

[6] The hardly graphitizable carbonaceous material according to any one of [1] to [5] mentioned above, further having a true density determined by a butanol method of 1.40 to 1.70 g/cm$^3$.

[7] The hardly graphitizable carbonaceous material according to any one of [1] to [6] mentioned above, further having a potassium element content of 0.1% by mass or less and an iron element content of 0.02% by mass or less.

[8] A method for producing the hardly graphitizable carbonaceous material according to any one of [1] to [7] mentioned above, comprising a step of subjecting a carbon precursor to an acid treatment and a step of calcining an acid-treated carbon precursor under an inert gas atmosphere at 1100° C. to 1400° C.

[9] A negative electrode material for nonaqueous electrolyte secondary batteries, comprising the hardly graphitizable carbonaceous material according to any one of [1] to [7] mentioned above.

[10] A nonaqueous electrolyte secondary battery, which comprises a negative electrode material for nonaqueous electrolyte secondary batteries comprising a hardly graphitizable carbonaceous material and which is fully charged to be used, wherein the hardly graphitizable carbonaceous material has an oxygen element content of 0.25% by mass or less.

[11] The nonaqueous electrolyte secondary battery according to [10] mentioned above, wherein a main resonance peak position of a chemical shift value of the hardly graphitizable carbonaceous material observed by $^7$Li nuclear-solid state NMR analysis is downfield by more than 115 ppm from a peak position of lithium chloride.

[12] The nonaqueous electrolyte secondary battery according to [10] or [11] mentioned above, wherein the hardly graphitizable carbonaceous material is derived from a carbon precursor originating from plants.

[13] The nonaqueous electrolyte secondary battery according to any one of [10] to [12] mentioned above, wherein the hardly graphitizable carbonaceous material has an average face-to-face dimension $d_{002}$ of the (002) face calculated from the Bragg equation by a wide angle X-ray diffraction method of 0.36 to 0.42 nm.

[14] The nonaqueous electrolyte secondary battery according to any one of [10] to [13] mentioned above, wherein the hardly graphitizable carbonaceous material has a specific surface area determined by a nitrogen adsorption BET three-point method of 1 to 20 m$^2$/g.

[15] The nonaqueous electrolyte secondary battery according to any one of [10] to [14] mentioned above, wherein the hardly graphitizable carbonaceous material has a true density determined by a butanol method of 1.40 to 1.70 g/cm$^3$.

[16] The nonaqueous electrolyte secondary battery according to any one of [10] to [15] mentioned above, wherein the hardly graphitizable carbonaceous material has a potassium element content of 0.1% by mass or less and an iron element content of 0.02% by mass or less.

Effects of the Invention

When the hardly graphitizable carbonaceous material according to the present invention is used to produce a nonaqueous electrolyte secondary battery fully charged to be used, such a nonaqueous electrolyte secondary battery has not only extremely high charge capacity but also extremely high charge-discharge efficiency.

EMBODIMENTS OF THE INVENTION

<Hardly Graphitizable Carbonaceous Material>

Figure 1:
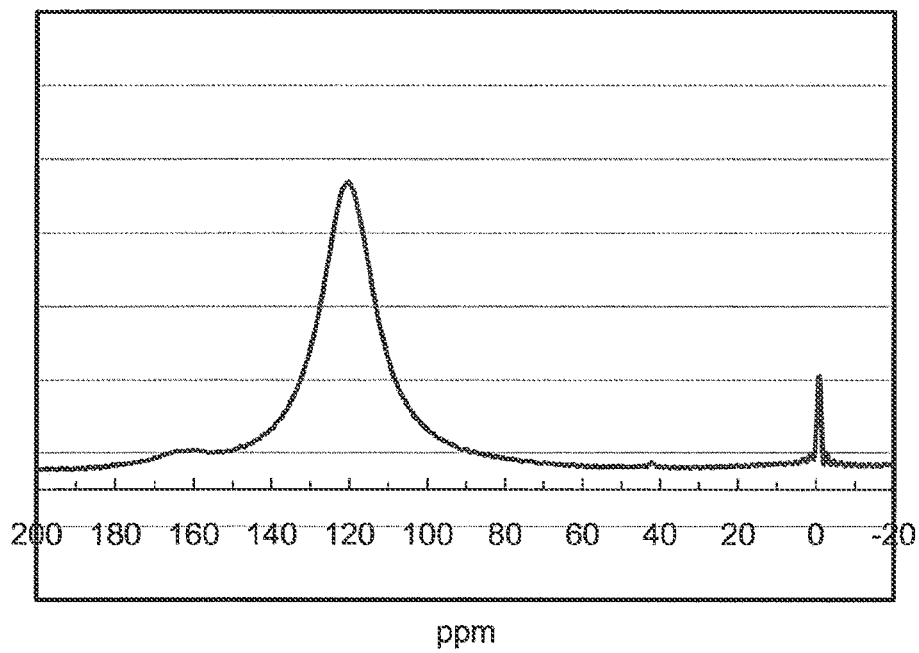
FIG. 1 shows an $^7$Li nuclear-solid state NMR spectrum of the hardly graphitizable carbonaceous material prepared in Example 1.

The hardly graphitizable carbonaceous material according to the present invention is a hardly graphitizable carbonaceous material for nonaqueous electrolyte secondary batteries fully charged to be used and has an oxygen element content of 0.25% by mass or less.

In the present specification, "a nonaqueous electrolyte secondary battery being fully charged to be used" refers to a nonaqueous electrolyte secondary battery being assembled with the use of a negative electrode comprising a hardly graphitizable carbonaceous material and a positive electrode comprising lithium, and allowing the negative electrode to be charged (doped) with lithium until just before precipitation of metallic lithium is confirmed by $^7$Li nuclear-solid state NMR analysis; and usually means a nonaqueous electrolyte secondary battery being charged at a constant current value so as to have a charge capacity within the range of 580 to 700 mAh/g per unit mass of the negative electrode active material. Accordingly, this has a meaning completely different from completing the charging by a conventional constant-current constant-voltage method described above to use a conventional nonaqueous electrolyte secondary battery. In this connection, from the viewpoint of keeping the battery capacity and charge-discharge efficiency high, the charge capacity of a negative electrode at the time when the negative electrode is charged with lithium until just before precipitation of metallic lithium is confirmed by 7Li nuclear-solid state NMR analysis is preferably set to 85 to 98%, further preferably set to 88 to 95%, and especially preferably set to 90 to 92% relative to a charge capacity at the time when lithium precipitation is confirmed.

<Oxygen Element Content>

It is good to make the oxygen element content of the hardly graphitizable carbonaceous material according to the present invention smaller. An analysis value thereof obtained by elemental analysis is usually 0.25% by mass or less and preferably 0.24% by mass or less. It is further preferred that the hardly graphitizable carbonaceous material contains substantially no oxygen element. In this context, containing substantially no oxygen element means having an oxygen element content equal to or less than $10^{-6}$% by mass which is a detection limit of the elemental analysis method (inert gas fusion-thermal conductivity method) described below. When the oxygen element content is the above-mentioned value or less, the lowering in utilization efficiency of lithium ions, which is caused because lithium ions are consumed by a reaction of the lithium ion with oxygen, and the lowering in utilization efficiency of lithium ions, which is caused because moisture in the air is induced by oxygen and water is adsorbed by the hardly graphitizable carbonaceous material and hardly desorbed therefrom, can be suppressed.

A method of adjusting the oxygen element content to the above-mentioned value or less is not limited at all. For example, by subjecting a carbon precursor originating from plants to an acid treatment at a predetermined temperature, then, mixing an acid-treated carbon precursor with a volatile organic substance, and calcining the mixture under an inert gas atmosphere at a temperature of 1100° C. to 1400° C., the oxygen element content can be adjusted to the above-mentioned value or less. The details of the measurement of the oxygen element content are as described in

EXAMPLES

<Main Resonance Peak Position of Chemical Shift Value>

When the hardly graphitizable carbonaceous material according to the present invention is taken out of a non-aqueous electrolyte secondary battery charged (doped) with lithium until a fully charged state thereof is attained, a main resonance peak position of a chemical shift value observed by subjecting the hardly graphitizable carbonaceous material to $^7$Li nuclear-solid state NMR analysis is preferably downfield by more than 115 ppm, more preferably downfield by more than 118 ppm, and especially preferably downfield by more than 120 ppm, from a peak position of lithium chloride. The details of the 7Li nuclear-solid state NMR analysis are as described in EXAMPLES.

A battery prepared with a hardly graphitizable carbonaceous material in which a main resonance peak position of a chemical shift value is downfield by more than 115 ppm from a peak position of lithium chloride, that is, the above-mentioned main resonance peak position is observed at the lower magnetic field side by more than 115 ppm, means a battery prepared with the hardly graphitizable carbonaceous material having a large storage amount of clustered lithium atoms, that is, a battery having a high charge capacity. The clustered lithium atoms occluded in a hardly graphitizable carbonaceous material are reversible lithium atoms that can be discharged (dedoped) therefrom, and a battery prepared with the hardly graphitizable carbonaceous material having a large storage amount of clustered lithium atoms means a battery having high charge-discharge efficiency calculated from "the discharge capacity/the charge capacity".

Having high charge-discharge efficiency means having little loss of lithium in the negative electrode caused by a side reaction during the charge-discharge and the like. When a battery has little loss of lithium in the negative electrode, it becomes unnecessary to complement lithium for the negative electrode by using an excess amount of materials for the positive electrode, and the battery becomes advantageous from an aspect of capacity per volume of the battery or cost of the battery.

Even by the use of a carbonaceous material having a main resonance peak position of a chemical shift value which is downfield by less than 115 ppm from a peak position of lithium chloride, unlike the hardly graphitizable carbonaceous material according to the present invention, it is quite difficult to achieve both extremely high charge capacity and extremely high charge-discharge efficiency because the storage amount of clustered lithium atoms thereof is small.

<Carbon Precursor>

For example, as described in JP-A-H9-161801 (the Patent Document 1) and JP-A-H10-21919 (the Patent Document 2), the hardly graphitizable carbonaceous material according to the present invention is derived from a phenol resin, a furan resin, pitch, tar, a carbon precursor originating from plants, or the like.

The hardly graphitizable carbonaceous material according to the present invention is preferably derived from a carbon precursor originating from plants. In the present invention, "a carbon precursor originating from plants" means a substance before carbonization originating from plants or a substance after carbonization originating from plants (char derived from plants). A plant as a raw material (hereinafter, sometimes referred to as "a plant raw material") is not particularly limited. For example, coconut shell, coffee beans, tea leaves, sugarcane, fruits (for example, mandarin oranges and bananas), straws, rice husks, a broad-leaved tree, a needle-leaved tree and bamboo can be exemplified. These exemplified plants include wastes after provided for its original purpose (for example, used tea leaves) and a portion of the plant raw material (for example, banana peels and mandarin orange peels). These plants can be used singly or in combination of two or more thereof. Of these plants, coconut shell, which is easily available abundantly, is preferred.

The coconut shell is not particularly limited. Examples thereof can include coconut shells of palm coconut (oil palm), coco palm, Salak, and sea coconut. These coconut shells can be used singly or in combination. Coconut shells of coco palm and palm coconut, which are utilized as foodstuffs, raw material of a detergent, raw material of a biodiesel fuel oil, and the like and are biomass wastes generated in large quantities, are especially preferred.

A method of carbonizing the plant raw material, that is, a method of producing the char derived from plants, is not particularly limited. The method can be performed, for example, by subjecting the plant raw material to a heat treatment under an inert gas atmosphere at 300° C. or more (hereinafter, sometimes referred to as "temporary calcination").

Moreover, the plant raw material in the form of char (for example, coconut shell char) is also available.

<Average Face-to-Face Dimension $d_{002}$>

The average face-to-face dimension $d_{002}$ of the (002) face calculated from the Bragg equation by a wide angle X-ray diffraction method of the hardly graphitizable carbonaceous material according to the present invention preferably falls within the range of 0.36 nm to 0.42 nm, more preferably falls within the range of 0.38 nm to 0.40 nm, and especially preferably falls within the range of 0.381 nm to 0.389 nm. When the average face-to-face dimension $d_{002}$ of the (002) face falls within the above-mentioned range, the lowering in input-output characteristics of a lithium ion battery caused by an electrical resistance made large at the time when lithium ions are inserted into the carbonaceous material or an electrical resistance made large at the time of output can be suppressed. Moreover, the lowering in stability of a battery material due to repeated expansion and shrinkage of the hardly graphitizable carbonaceous material can be suppressed. Furthermore, the lowering in effective capacity per volume caused by a volume of the hardly graphitizable carbonaceous material made large while a diffusion resistance of the lithium ion is made small can be avoided. In order to adjust the average face-to-face dimension within the above-mentioned range, for example, a carbon precursor giving a hardly graphitizable carbonaceous material may be calcined at a calcination temperature within the range of 1100 to 1400° C. Moreover, a method in which a carbon precursor is mixed with a thermally-decomposable resin such as polystyrene to be calcined can also be adopted. In this context, the details of the measurement of the average face-to-face dimension $d_{002}$ are as described in EXAMPLES.

<Specific Surface Area>

The specific surface area determined by a nitrogen adsorption BET three-point method of the hardly graphitizable carbonaceous material according to the present invention preferably falls within the range of 1 to 20 $m^2/g$, more preferably falls within the range of 1.2 to 10 $m^2/g$, and especially preferably falls within the range of 1.4 to 9.5 $m^2/g$. When the specific surface area falls within the above-mentioned range, the number of micropores in the hardly graphitizable carbonaceous material can be sufficiently reduced by a calcination step described below, the moisture-absorption characteristics of the hardly graphitizable carbonaceous material can be sufficiently lowered, and in a nonaqueous electrolyte secondary battery produced with the use of the hardly graphitizable carbonaceous material, a lowering in utilization efficiency of lithium ions can be suppressed. The specific surface area can be adjusted by controlling the temperature in a demineralization step described below. In this context, the details of the measurement of the specific surface area by a nitrogen adsorption BET three-point method are as described in EXAMPLES.

<True Density $\rho_{Bt}$>

From the viewpoint of making the capacity per mass of the battery high, the true density by a butanol method of the hardly graphitizable carbonaceous material according to the present invention preferably falls within the range of 1.40 to 1.70 $g/cm^3$, more preferably falls within the range of 1.42 to 1.65 $g/cm^3$, and especially preferably falls within the range of 1.44 to 1.60 $g/cm^3$. The true density within the above-mentioned range can be attained, for example, by setting the calcination step temperature at the time of producing a hardly graphitizable carbonaceous material from the plant raw material to 1100 to 1400° C. In this context, the details of the measurement of the true density pit are as described in EXAMPLES.

<Potassium Element Content and Iron Element Content>

From the viewpoint of making the dedoping capacity large and the viewpoint of making the nondedoping capacity small, the potassium element content of the hardly graphitizable carbonaceous material according to the present invention is preferably 0.1% by mass or less, more preferably 0.05% by mass or less, and further preferably 0.03% by mass or less. It is especially preferred that the hardly graphitizable carbonaceous material contains substantially no potassium element. Moreover, from the viewpoint of making the dedoping capacity large and the viewpoint of making the nondedoping capacity small, the iron element content of the hardly graphitizable carbonaceous material according to the present invention is preferably 0.02% by mass or less, more preferably 0.015% by mass or less, and further preferably 0.01% by mass or less. It is especially preferred that the hardly graphitizable carbonaceous material contains substantially no iron element. In this context, containing substantially no potassium element or substantially no iron element means having a potassium element content or an iron element content equal to or less than the detection limit value in the X-ray fluorescence analysis (for example, analysis using the "LAB CENTER XRF-1700" available from SHIMADZU CORPORATION) described below. When the potassium element content and the iron element content are equal to or less than the above-mentioned values, respectively, in a nonaqueous electrolyte secondary battery prepared with the hardly graphitizable carbonaceous material, a sufficient dedoping capacity and a satisfactory nondedoping capacity can be attained. Furthermore, a safety problem of the nonaqueous electrolyte secondary battery due to a short circuit at the time when these metallic elements are eluted into the electrolyte to be precipitated again can be avoided. The details of the measurement of the potassium element content and iron element content are as described in EXAMPLES.

<Moisture Content>

The moisture content of the hardly graphitizable carbonaceous material according to the present invention is preferably 10000 ppm or less, more preferably 9000 ppm or less, and especially preferably 8000 ppm or less. The smaller the moisture content, the amount of water that adsorbs to the hardly graphitizable carbonaceous material is reduced and the number of lithium ions that adsorb to the hardly graphitizable carbonaceous material is increased, which is preferable. Moreover, the smaller the moisture content, self-discharge caused by a reaction of lithium ions with adsorbed water can be reduced, which is preferable. The moisture content of the hardly graphitizable carbonaceous material can be reduced, for example, by reducing the number of oxygen atoms contained in a hardly graphitizable carbonaceous material. The moisture content of the hardly graphitizable carbonaceous material can be measured, for example, by the use of a Karl Fischer moisture meter or the like. The details of the measurement of the moisture content are as described in EXAMPLES.

<Production Method of Hardly Graphitizable Carbonaceous Material>

A method for producing the hardly graphitizable carbonaceous material according to the present invention comprises a step of subjecting a carbon precursor (for example, a carbon precursor originating from plants) to an acid treatment and a step of calcining an acid-treated carbon precursor under an inert gas atmosphere at 1100° C. to 1400° C.

<Carbon Precursor>

As described above, "a carbon precursor" refers to a phenol resin, a furan resin, pitch, tar, a carbon precursor originating from plants, or the like. In the present invention, it is preferred that the carbon precursor is a carbon precursor originating from plants.

As described above, "a carbon precursor originating from plants" means a substance before carbonization originating from plants or a substance after carbonization originating from plants (char derived from plants). A plant as a raw material (a plant raw material) is not particularly limited. Such plants exemplified above can be used singly or in combination of two or more thereof. Of these, coconut shell, which is easily available abundantly, is preferred.

The coconut shell is not particularly limited. Such coconut shells exemplified above can be used singly or in combination. Coconut shells of coco palm and palm coconut, which are utilized as foodstuffs, raw material of a detergent, raw material of a biodiesel fuel oil, and the like and are biomass wastes generated in large quantities, are especially preferred.

A method of carbonizing the plant raw material, that is, a method of producing the char derived from plants, is not particularly limited. For example, the method can be performed by subjecting the plant raw material to a heat treatment under an inert gas atmosphere at 300° C. or more (hereinafter, sometimes referred to as "temporary calcination").

Moreover, the plant raw material in the form of char (for example, coconut shell char) is also available.

In general, the plant raw material contains alkali metal elements (for example, potassium, sodium), alkaline earth metal elements (for example, magnesium, calcium), transition metal elements (for example, iron, copper), non-metallic elements (for example, phosphorus), and the like in large amounts. When a hardly graphitizable carbonaceous material containing such metallic elements and non-metallic elements in large amounts is used as a negative electrode material, these elements sometimes can give an undesirable influence on electrochemical characteristics or safety of the nonaqueous electrolyte secondary battery.

<Acid Treatment>

Accordingly, a method for producing the hardly graphitizable carbonaceous material according to the present invention comprises a step of subjecting a carbon precursor (for example, a carbon precursor originating from plants) to an acid treatment. In this context, hereinafter, subjecting a carbon precursor (for example, a carbon precursor originating from plants) to an acid treatment to lower the content of a metallic element and/or a non-metallic element in the carbon precursor also refers to demineralizing a carbon precursor.

A method for the acid treatment, that is, a method for the demineralization, is not particularly limited. For example, a method of extracting a metallic component in a carbon precursor with the use of acidic water containing mineral acids such as hydrochloric acid and sulfuric acid, organic acids such as acetic acid and formic acid, and the like to demineralize the carbon precursor (liquid phase demineralization), a method of exposing a carbon precursor to a high-temperature vapor phase containing a halogen compound such as hydrogen chloride to demineralize the carbon precursor (vapor phase demineralization), and the like can be adopted.

<Liquid Phase Demineralization>

In the liquid phase demineralization, it is preferred that a carbon precursor (for example, a carbon precursor originating from plants) is immersed in an aqueous organic acid solution to elute alkali metal elements, alkaline earth metal elements, and/or non-metallic elements to be removed from the carbon precursor into the aqueous organic acid solution.

When a carbon precursor (for example, a carbon precursor originating from plants) containing these metallic elements is carbonized, a necessary carbonaceous component is sometimes decomposed at the time of carbonization. Moreover, a carbon precursor containing a non-metallic element is not preferred because the non-metallic element such as phosphorus is liable to be oxidized to make the degree of oxidation on the surface of a carbonized product vary and to make characteristics of the carbonized product significantly vary. Furthermore, when a carbon precursor is carbonized and then subjected to a liquid phase demineralization treatment, phosphorus, calcium, and magnesium sometimes fail to be sufficiently removed. Moreover, the required time for the liquid phase demineralization and the remaining amount of a metallic element and/or a non-metallic element in a carbonized product after liquid phase demineralization greatly vary depending on the content of a metallic element and/or a non-metallic element in a carbonized product before liquid phase demineralization. Accordingly, it is preferred that a metallic element and/or a non-metallic element in a carbon precursor is sufficiently removed before carbonization to lower the content thereof. That is, it is preferred that, in liquid phase demineralization, a substance (for example, a substance originating from plants) before carbonization is used as "a carbon precursor (for example, a carbon precursor originating from plants)".

It is preferred that the organic acid used in liquid phase demineralization does not contain any element acting as an impurity source such as phosphorus, sulfur, and a halogen. In the case where the organic acid does not contain any element such as phosphorus, sulfur, and a halogen, such an organic acid is advantageous because a carbonized product that can be suitably used as the carbon material is obtained even when a water washing process after liquid phase demineralization is omitted and a carbon precursor allowing an organic acid to remain therein is carbonized. Moreover, such an organic acid is advantageous because a waste liquid treatment for a waste liquid of the organic acid after use can be relatively easily performed without using a special apparatus.

Examples of the organic acid include saturated carboxylic acids such as formic acid, acetic acid, propionic acid, oxalic acid, tartaric acid, and citric acid, unsaturated carboxylic acids such as acrylic acid, methacrylic acid, maleic acid, and fumaric acid, and aromatic carboxylic acids such as benzoic acid, phthalic acid, and naphthoic acid. From the viewpoints of availability, corrosion due to the degree of acidity, and influence on human bodies, acetic acid, oxalic acid, and citric acid are preferred.

In the present invention, from the viewpoints of solubility of a metallic compound to be eluted, waste disposal treatment, environmental suitability, and the like, an organic acid is mixed with an aqueous medium to be used as an aqueous organic acid solution. Examples of the aqueous medium include water, a mixture of water and a water-soluble organic solvent, and the like. Examples of the water-soluble organic solvent include alcohols such as methanol, ethanol, propylene glycol, and ethylene glycol.

The concentration of an acid in the aqueous organic acid solution is not particularly limited. The acid concentration of an aqueous organic acid solution can be adjusted depending on the kind of the acid used to prepare the aqueous organic acid solution. In the present invention, an aqueous organic acid solution with an acid concentration falling within the range of usually 0.001% by mass to 20% by mass, more preferably 0.01% by mass to 18% by mass, and especially preferably 0.02% by mass to 15% by mass, on the basis of the whole amount of the aqueous organic acid solution is usually used. It is possible to perform a liquid phase demineralization treatment within a practical time period as long as the acid concentration falls within the above-mentioned range because an appropriate elution rate of a metallic element and/or a non-metallic element can be attained. Moreover, since the residual amount of the acid in a carbon precursor becomes small, the influence on a product in a subsequent process also becomes small.

The pH of an aqueous organic acid solution is preferably 3.5 or less and more preferably 3 or less. In the case where the pH of an aqueous organic acid solution is not more than the above-mentioned value, the dissolution rate of a metallic element and/or a non-metallic element eluted into the aqueous organic acid solution is not lowered and the removal of a metallic element and/or a non-metallic element can be effectively performed.

The liquid temperature of an aqueous organic acid solution at the time of immersing a carbon precursor therein is not particularly limited. The liquid temperature thereof falls within the range of preferably 45° C. to 120° C., more preferably 50° C. to 110° C., and especially preferably 60° C. to 100° C. Such an aqueous organic acid solution is preferred because decomposition of the acid used is suppressed and an elution rate of a metallic element enabling a liquid phase demineralization treatment within a practical time period to be performed is attained as long as the liquid temperature of the aqueous organic acid solution at the time of immersing a carbon precursor therein falls within the above-mentioned range. Moreover, such an aqueous organic acid solution is preferred because a liquid phase demineralization treatment can be performed without using a special apparatus.

The time period during which a carbon precursor is immersed in an aqueous organic acid solution can be appropriately adjusted depending on the acid used. In the present invention, from the viewpoints of economy and demineralization efficiency, the immersion time falls within the range of usually 1 to 100 hours, preferably 2 to 80 hours, and more preferably 2.5 to 50 hours.

The proportion of the mass of a carbon precursor to be immersed in an aqueous organic acid solution to the mass of the aqueous organic acid solution can be appropriately adjusted depending on the kind of the aqueous organic acid solution used, the concentration, the temperature, and the like and falls within the range of usually 0.1% by mass to 200% by mass, preferably 1% by mass to 150% by mass, and more preferably 1.5% by mass to 120% by mass. Such a proportion is preferred because a metallic element and/or a non-metallic element eluted into an aqueous organic acid solution hardly precipitate from the aqueous organic acid solution and reattachment thereof to a carbon precursor is suppressed as long as the proportion falls within the above-mentioned range. Moreover, such a proportion is preferred in the point of an economic aspect because the volume efficiency becomes appropriate as long as the proportion falls within the above-mentioned range.

The atmosphere under which a liquid phase demineralization treatment is performed is not particularly limited and may vary depending on the method used for the immersion. In the present invention, a liquid phase demineralization treatment is usually performed under an air atmosphere.

A series of these operations can be repeated preferably one time to five times and more preferably two times to four times to perform the liquid phase demineralization.

In the present invention, after liquid phase demineralization, a washing step and/or a drying step can be performed as necessary.

<Vapor Phase Demineralization>

In the vapor phase demineralization, it is preferred that a carbon precursor (for example, a carbon precursor originating from plants) is subjected to a heat treatment in a vapor phase containing a halogen compound. When the vapor phase demineralization is accompanied by a sudden thermal decomposition reaction of a carbon precursor at the time of the heat treatment, sometimes, the vapor phase demineralization efficiency can be lowered due to generation of thermally decomposed components, the inside of a heat treatment apparatus can be contaminated by the thermally decomposed components generated, and the thermally decomposed components can disturb safe operation. From these viewpoints, it is preferred that a substance (for example, a substance originating from plants) after carbonization is used as "a carbon precursor (for example, a carbon precursor originating from plants)".

The halogen compound used in a vapor phase demineralization treatment is not particularly restricted. For example, fluorine, chlorine, bromine, iodine, hydrogen fluoride, hydrogen chloride, hydrogen bromide, iodine bromide, chlorine fluoride (CiF), iodine chloride (IC), iodine bromide (IBr), bromine chloride (BrCl), and a mixture thereof can be used. Compounds that generate these halogen compounds by thermal decomposition or a mixture thereof can also be used. From the viewpoints of supply stability and stability of the halogen compound used, it is preferred that hydrogen chloride is used.

In a vapor phase demineralization treatment, a halogen compound and an inert gas may be mixed to be used. The inert gas is not particularly restricted as long as the inert gas does not react with a carbon component constituting a carbon precursor (for example, a carbon precursor originating from plants). For example, nitrogen, helium, argon, krypton, or a mixed gas thereof can be used. From the viewpoints of supply stability and economy, it is preferred that nitrogen is used.

In a vapor phase demineralization treatment, the mixing ratio between a halogen compound and an inert gas is not particularly limited as long as sufficient demineralization can be attained. For example, from the viewpoints of safety, economy, and residual properties on the carbon component, the volume ratio of a halogen compound to an inert gas preferably falls within the range of 0.01 to 10.0% by volume, more preferably falls within the range of 0.05 to 8.0% by volume, and especially preferably falls within the range of 0.1 to 5.0% by volume.

Although the treatment temperature for a vapor phase demineralization treatment may vary depending on the kind of a carbon precursor (for example, a carbon precursor originating from plants) to be demineralized, from the viewpoint of attaining a desired oxygen element content and specific surface area, the vapor phase demineralization treatment can be performed at for example 500 to 950° C., preferably 600 to 940° C. more preferably 650 to 940° C., and especially preferably 850 to 930° C. When the demineralization temperature falls within the above-mentioned range, satisfactory demineralization efficiency can be attained to sufficiently demineralize the carbon precursor and activation by a halogen compound can be avoided.

The time period for the vapor phase demineralization is not particularly restricted. From the viewpoints of economic efficiency in reaction facilities and structure-preserving properties of a carbonaceous component, the time period for example falls within the range of 5 to 300 minutes, preferably falls within the range of 10 to 200 minutes, and more preferably falls within the range of 20 to 150 minutes.

The particle diameter of a carbon precursor (for example, a carbon precursor originating from plants) to be subjected to vapor phase demineralization is not particularly limited. The lower limit of an average value of particle diameters is preferably 100 µm or more, more preferably 300 µm or more, and especially preferably 500 µm or more because it may become difficult for the vapor phase containing potassium and the like which are removed from a carbon precursor and the carbon precursor to be separated from each other in the case where the particle diameter is too small. Moreover, from the viewpoint of the fluidity in a mixed gas stream, the upper limit of an average value of particle diameters is preferably 10000 μm or less, more preferably 8000 μm or less, and especially preferably 5000 μm or less. In this context, the details of the measurement of the particle diameter are as described in EXAMPLES.

An apparatus used in the vapor phase demineralization is not particularly limited as long as the apparatus enables the vapor phase containing a halogen compound to be heated and stirred together with a carbon precursor (for example, a carbon precursor originating from plants). For example, a fluidized bed or the like can be used and a continuous or batch-wise fluid layer distribution system can be adopted. The supply volume (fluidization quantity) of the vapor phase is also not particularly limited. From the viewpoint of the fluidity in a mixed gas stream, the vapor phase is supplied at a rate of preferably 1 mL/minute or more, more preferably 5 mL/minute or more, and especially preferably 10 mL/minute or more, per 1 g of a carbon precursor (for example, a carbon precursor originating from plants).

In the vapor phase demineralization, it is preferred that, after a heat treatment in an inert gas atmosphere containing a halogen compound (hereinafter, sometimes referred to as "a halogen heat treatment"), a heat treatment in an atmosphere containing no halogen compound (hereinafter, sometimes referred to as "a vapor phase deacidification treatment") is further performed. Since the halogen heat treatment causes halogen elements to be contained in a carbon precursor (for example, a carbon precursor originating from plants), it is preferred that halogen elements contained in the carbon precursor is removed by a vapor phase deacidification treatment. Specifically, as the vapor phase deacidification treatment, a heat treatment in an inert gas atmosphere containing no halogen compound is performed at a temperature falling within the range of usually 500° C. to 940° C., preferably 600 to 940° C., more preferably 650 to 940° C., and especially preferably 850 to 930° C. It is preferred that this heat treatment is performed at a temperature equal to or higher than the treatment temperature for the preceding halogen heat treatment. For example, after the halogen heat treatment, supply of the halogen compound can be cut off to perform a heat treatment as the vapor phase deacidification treatment. Moreover, the time period for the vapor phase deacidification treatment is also not particularly limited. The time period preferably falls within the range of 5 minutes to 300 minutes, more preferably falls within the range of 10 minutes to 200 minutes, and especially preferably falls within the range of 10 minutes to 100 minutes.

The acid treatment in the present invention is a treatment in which potassium, iron, and the like contained in a carbon precursor (for example, a carbon precursor originating from plants) are removed (a carbon precursor is demineralized). With regard to the carbon precursor to be subjected to an acid treatment, the potassium element content is reduced by the acid treatment preferably to 0.1% by mass or less, more preferably to 0.05% by mass or less, and further preferably to 0.03% by mass or less. The potassium element content is reduced especially preferably to such a degree that the hardly graphitizable carbonaceous material contains substantially no potassium element. Moreover, with regard to the carbon precursor to be subjected to an acid treatment, the iron element content is reduced by the acid treatment preferably to 0.02% by mass or less, more preferably to 0.015% by mass or less, and further preferably to 0.01% by mass or less. The iron element content is reduced especially preferably to such a degree that the hardly graphitizable carbonaceous material contains substantially no iron element. In this context, containing substantially no potassium element or substantially no iron element means having a potassium element content or an iron element content equal to or less than the detection limit value in the X-ray fluorescence analysis (for example, analysis using the "LAB CENTER XRF-1700" available from SHIMADZU CORPORATION) described below. As described above, when the potassium element content and the iron element content are equal to or less than the above-mentioned values, respectively, a sufficient dedoping capacity and a satisfactory nondedoping capacity can be attained and a safety problem of the nonaqueous electrolyte secondary battery can be avoided. The details of the measurement of the potassium element content and iron element content are as described in EXAMPLES.

In the acid treatment in the present invention, a part of carbon components is removed while the carbon precursor is demineralized. Specifically, a part of carbon components is removed by the elution in the case of liquid phase demineralization and a part of carbon components is removed by the activation action of chlorine in the case of vapor phase demineralization. A space from which a carbon component is removed plays a role of a storage site for clustered lithium atoms after a calcination step described below.

In the present invention, the acid treatment is performed at least one time. The same or different acids may be used to perform the acid treatment two times or more.

A carbon precursor (for example, a carbon precursor originating from plants) to be subjected to an acid treatment is a substance (for example, a substance originating from plants) before carbonization or a substance (for example, a substance originating from plants) after carbonization. In the case of performing an acid treatment by liquid phase demineralization, from the viewpoint of an increase in the elution amount of carbon components, that is, an increase in the number of lithium storage sites, it is preferred that a raw material (for example, a plant raw material) before carbonization itself is subjected to a liquid phase demineralization treatment as an acid treatment.

In the case where a carbon precursor after the acid treatment is a carbon precursor not subjected to a carbonization treatment yet, that is, the case where a carbon precursor after the acid treatment is a carbon precursor prepared by subjecting a raw material (for example, a plant raw material) before carbonization to the acid treatment, subsequently, the carbon precursor is subjected to a carbonization treatment. As described above, the carbonizing method is not particularly limited. For example, an acid-treated raw material (for example, an acid-treated plant raw material) before carbonization can be subjected to a heat treatment under an inert gas atmosphere at 300° C. or more (temporary calcination) to be carbonized.

A carbon precursor (for example, a carbon precursor originating from plants) may be pulverized and classified as necessary and the average particle diameter thereof may be adjusted. It is preferred that a pulverization step and a classification step is performed after an acid treatment.

<Pulverization>

In a pulverization step, it is preferred that a carbon precursor (for example, a carbon precursor originating from plants) is pulverized so as to have an average particle diameter after a calcination step falling within, for example, the range of 3 to 30 μm from the viewpoint of coating properties at the time of preparing an electrode. That is, the hardly graphitizable carbonaceous material according to the present invention is adjusted so as to have an average particle diameter ($Dv_{50}$) falling within, for example, the range of 3 to 30 μm. When the average particle diameter of the hardly graphitizable carbonaceous material is 3 μm or more, a tendency that the amount of fine powder increases, the specific surface area increases, the reactivity with an electrolytic solution is heightened, the irreversible capacity being a capacity which is not dischargeable in spite of being charged into a battery increases, and the portion of useless capacity in a positive electrode increases can be suppressed. Moreover, at the time of using the resulting hardly graphitizable carbonaceous material to produce a negative electrode, voids to be formed between particles of the carbonaceous material can be sufficiently secured and satisfactory transfer of lithium ions in an electrolytic solution can be secured. The average particle diameter ($Dv_{50}$) of the carbonaceous material of the present invention is preferably 3 μm or more, more preferably 4 μm or more, and especially preferably 5 μm or more. On the other hand, when the average particle diameter is 30 μm or less, such a carbonaceous material is preferred because the mean free path of lithium ions diffusing into the inside of a particle is shortened and the quick charge-discharge is possible. Furthermore, in a lithium ion secondary battery, enlarging the electrode area is of importance for enhancing the input-output characteristics, and for this reason, the coating thickness of an active material onto a current collecting plate is required to be thinned at the time of the electrode preparation. In order to make the coating thickness thin, the active material is required to have a small particle diameter. From such viewpoints, the average particle diameter is preferably 30 μm or less, more preferably 19 μm or less, further preferably 17 μm or less, still further preferably 16 μm or less, and especially preferably 15 μm or less.

In this connection, depending on the conditions of the final calcination described below, a carbon precursor (for example, a carbon precursor originating from plants) is shrunk by 0 to 20% or so. Therefore, in order to make the average particle diameter after calcination fall within the range of 3 to 30 μm, it is preferred that the average particle diameter of a carbon precursor is adjusted so as to be an average particle diameter larger by 0 to 20% or so than the desired average particle diameter after calcination. Accordingly, it is preferred that the pulverization is performed so as to make the average particle diameter after pulverization fall within the range of preferably 3 to 36 μm, more preferably 3 to 22.8 μm, further preferably 3 to 20.4 μm, still further preferably 3 to 19.2 μm, and especially preferably 3 to 18 μm.

Since the carbon precursor does not melt even when subjected to the calcination step described below, the pulverization step is not particularly limited in the sequence of steps. In view of the recovery (yield) of a carbon precursor in an acid treatment, it is preferred that the pulverization step is performed after an acid treatment and it is preferred that the pulverization step is performed before a calcination step from the viewpoint of sufficiently reducing the specific surface area of the carbonaceous material. However, the pulverization step may also be performed before an acid treatment or after a calcination step, and these cases are not eliminated.

A pulverizer used in the pulverization step is not particularly limited. For example, a jet mill, a ball mill, a hammer mill, a rod mill, or the like can be used. From the viewpoint of having little generation of fine powder, a jet mill equipped with a classifying function is preferred. In the case of using a ball mill, a hammer mill, a rod mill, or the like, classification can be performed after a pulverization step to remove fine powder.

<Classification>

A classification step enables the average particle diameter of the carbonaceous material to be more accurately adjusted. For example, it is possible to remove particles with a particle diameter of 1 μm or less.

In the case of removing particles with a particle diameter of 1 μm or less by classification, it is preferred that the hardly graphitizable carbonaceous material according to the present invention has a content of particles with a particle diameter of 1 μm or less of 3% by volume or less. Although no particular restriction is put on the removal of particles with a particle diameter of 1 μm or less as long as the removal is performed after pulverization, it is preferred that pulverization and classification is simultaneously performed. In the hardly graphitizable carbonaceous material according to the present invention, from the viewpoints of lowering the specific surface area and lowering the irreversible capacity, the content of particles with a particle diameter of 1 μm or less is preferably 3% by volume or less, more preferably 2.5% by volume or less, and especially preferably 2.0% by volume or less.

The classifying method is not particularly restricted. Examples thereof can include classification with a sieve, wet classification, and dry classification. Examples of a wet classifier can include a classifier utilizing the principle of gravity classification, inertial classification, hydraulic classification, centrifugal classification, or the like. Examples of a dry classifier can include a classifier utilizing the principle of sedimentary classification, mechanical classification, centrifugal classification, or the like.

A pulverization step and a classification step may be performed with the use of one apparatus. For example, a jet mill equipped with a dry classifying function can be used to perform a pulverization step and a classification step. Furthermore, an apparatus equipped with a pulverizer and a classifier, both of which are constituted independently respectively, may be used. In this case, pulverization and classification can be sequentially performed, and moreover, pulverization and classification can be discontinuously performed.

<Calcination>

After being pulverized and classified depending on the situation, a carbon precursor which has been subjected to an acid treatment and a carbonization treatment can be calcined to produce the hardly graphitizable carbonaceous material according to the present invention. A calcination step is a step of elevating the atmosphere temperature from room temperature to a predetermined calcination temperature, and then, performing calcination at the calcination temperature. The carbon precursor (a) may be calcined at a temperature of 1100 to 1400° C. (final calcination) or the carbon precursor (b) may be calcined at a temperature of 350 to less than 1100° C. (preliminary calcination), and then, further calcined at a temperature of 1100 to 1400° C. (final calcination). Hereinafter, an example of each of the procedure of preliminary calcination and the procedure of final calcination will be described in this order.

<Preliminary Calcination>

For example, a carbon precursor which has been subjected to an acid treatment and a carbonization treatment can be calcined at a temperature of 350 to less than 1100° C. to perform a preliminary calcination step in a method for producing the hardly graphitizable carbonaceous material according to the present invention. By performing preliminary calcination to remove volatile components (for example, $CO_2$, CO, $CH_4$, $H_2$, and the like) and a tar constituent, the generation amounts thereof in final calcination can be decreased to reduce the load of a calciner. The preliminary calcination temperature usually falls within the range of 350 to less than 1100° C. and preferably falls within the range of 400 to less than 1100° C. The preliminary calcination can be performed according to a usual procedure for preliminary calcination. Specifically, the preliminary calcination can be performed in an inert gas atmosphere and examples of the inert gas can include nitrogen, argon, or the like. Moreover, the preliminary calcination can also be performed under reduced pressure, and for example, the preliminary calcination can be performed under a pressure of 10 KPa or less. The time period for the preliminary calcination is not particularly limited, usually falls within the range of 0.5 to 10 hours, and preferably falls within the range of 1 to 5 hours.

In this connection, in the case of performing the preliminary calcination in a method for producing the hardly graphitizable carbonaceous material according to the present invention, it is considered that a phenomenon in which a carbon precursor is coated with a tar constituent and a hydrocarbon-based gas occurs in the preliminary calcination step. It is considered that this carbonaceous coating film causes the specific surface area of a hardly graphitizable carbonaceous material to be favorably decreased.

<Final Calcination>

A final calcination step in a method for producing the hardly graphitizable carbonaceous material according to the present invention can be performed according to a usual procedure for final calcination, and after the final calcination, a hardly graphitizable carbonaceous material is obtained.

The final calcination temperature usually falls within the range of 1100 to 1400° C., preferably falls within the range of 1200 to 1380° C., and more preferably falls within the range of 1250 to 1350° C. The final calcination can be performed in an inert gas atmosphere and examples of the inert gas can include nitrogen, argon, or the like. Moreover, it is also possible to perform the final calcination in an inert gas atmosphere containing a halogen gas. Furthermore, it is also possible to perform the final calcination under reduced pressure, for example, under a pressure of 10 KPa or less. The time period for the final calcination is not particularly limited, and the time period falls within the range of for example 0.05 to 10 hours, preferably 0.05 to 8 hours, and more preferably 0.05 to 6 hours.

In this connection, in the case of not performing preliminary calcination in a method for producing the hardly graphitizable carbonaceous material according to the present invention, it is considered that a phenomenon in which a carbon precursor is coated with a tar constituent and a hydrocarbon-based gas occurs in the final calcination step.

In the present invention, at the time of calcining a carbon precursor, the carbon precursor can be mixed with a volatile organic substance to be calcined. By being mixed with a volatile organic substance to be calcined, a hardly graphitizable carbonaceous material obtained from the carbon precursor can have a specific surface area more suitable for a negative electrode material for lithium ion secondary batteries.

<Volatile Organic Substance>

Although a volatile organic substance that can be used in the present invention is not particularly limited as long as the volatile organic substance is solid at an ambient temperature and has a residual carbon ratio of less than 5% by mass on the basis of the mass of a volatile organic substance before ashing in the case of being ashed at 800° C. A volatile organic substance, from which volatile substances (for example, a hydrocarbon-based gas and a tar constituent) enabling the specific surface area of a hardly graphitizable carbonaceous material produced from the carbon precursor to be decreased are generated, is preferred. Although the content of volatile substances enabling the specific surface area to be decreased in a volatile organic substance is not particularly limited, the content thereof usually falls within the range of 1 to 20% by mass and preferably falls within the range of 3 to 15% by mass on the basis of the mass of the volatile organic substance. In this connection, in the present specification, the ambient temperature refers to 25° C.

Examples of the volatile organic substance can include a thermoplastic resin and a low molecular weight organic compound. More specifically, examples of the thermoplastic resin can include polystyrene, polyethylene, polypropylene, poly(meth)acrylic acid, a poly(meth)acrylic acid ester, or the like, and examples of the low molecular weight organic compound can include toluene, xylene, mesitylene, styrene, naphthalene, phenanthrene, anthracene, pyrene, or the like. From the viewpoint that the surface of a carbon precursor is not oxidatively activated in the case of being allowed to volatilize and thermally decomposed at a calcination temperature, polystyrene, polyethylene, or polypropylene is preferred as the thermoplastic resin and naphthalene, phenanthrene, anthracene, or pyrene is preferred as the low molecular weight organic compound. From the viewpoint of being preferable in view of restriction of safety because of the low volatility under an ordinary temperature condition, it is further preferred that naphthalene, phenanthrene, anthracene, or pyrene is used.

The residual carbon ratio of the sample can be measured by quantitatively determining the carbon content of an intensively-heating residue obtained after a sample is intensively heated in an inert gas atmosphere. A sample being intensively heated means about 1 g (the accurately weighed mass is defined as $W_1$ (g)) of a volatile organic substance being placed in a crucible, and the temperature of the crucible being elevated at a rate of 10° C./minute to 800° C. in an electric furnace with a nitrogen flow at a rate of 20 liters per 1 minute, and then, maintained for 1 hour at 800° C. A residue thus obtained corresponds to an intensively-heating residue, and the mass thereof is defined as $W_2$ (g).

Then, the intensively-heating residue is analyzed for the elemental analysis in accordance with a method stipulated in JIS M8819 to be measured for the mass proportion $P_1(\%)$ of carbon. The residual carbon ratio $P_2(\%)$ is calculated from the following equation.

$$P_2 = P_1 \times \frac{W_2}{W_1} \qquad \text{[Mathematical 1]}$$

In the case where a carbon precursor and a volatile organic substance are mixed to be calcined, the carbon precursor and the volatile organic substance are mixed preferably at a mass ratio of 97:3 to 40:60. This mixing ratio more preferably falls within the range of 95:5 to 60:40 and especially preferably falls within the range of 93:7 to 80:20. By making the mixing ratio fall within the above-mentioned range, while the specific surface area of a hardly graphitizable carbonaceous material can be sufficiently decreased, the wasteful consumption of the volatile organic substance due to the saturation of the effect of decreasing the specific surface area can be avoided.

The mixing of a carbon precursor and a volatile organic substance may be performed in a stage before or after pulverization of the carbon precursor. In the case where a carbon precursor before pulverization is mixed with a volatile organic substance, the carbon precursor and the volatile organic substance can be simultaneously weighed and fed into a pulverizing apparatus to simultaneously perform pulverization and mixing. It is also preferred that a carbon precursor after pulverization is mixed with a volatile organic substance. As a mixing method in this case, any mixing method may be adopted as long as the two are uniformly mixed.

It is preferred that a volatile organic substance is mixed in a particulate form, but the shape of particles and the particle diameter are not particularly limited. From the viewpoint of uniformly dispersing a volatile organic substance in a mixture of a pulverized product of a carbon precursor and the volatile organic substance, the average particle diameter of the volatile organic substance preferably falls within the range of 0.1 to 2000 μm, more preferably falls within the range of 1 to 1000 μm, and especially preferably falls within the range of 2 to 600 μm.

The mixture of a carbon precursor and a volatile organic substance may contain an additional ingredient other than the carbon precursor and the volatile organic substance as long as effects on the hardly graphitizable carbonaceous material according to the present invention are exerted, that is, as long as the specific surface area of the hardly graphitizable carbonaceous material is decreased. For example, the mixture can further contain natural graphite, artificial graphite, a metal-based material, an alloy-based material, or an oxide-based material. The content of the additional ingredient is not particularly limited and is preferably 50 parts by mass or less, more preferably 30 parts by mass or less, further preferably 20 parts by mass or less, and especially preferably 10 parts by mass or less, relative to 100 parts by mass of the mixture of a carbon precursor and a volatile organic substance.

<Negative Electrode Material for Nonaqueous Electrolyte Secondary Batteries>

The negative electrode material for nonaqueous electrolyte secondary batteries according to the present invention comprises the hardly graphitizable carbonaceous material according to the present invention.

<Production of Anode Electrode>

By adding a binding agent (binder) to the hardly graphitizable carbonaceous material, further adding a suitable amount of a suitable solvent thereto, kneading the contents to prepare an electrode mixture, then, applying the electrode mixture onto a current collecting plate composed of a metal plate and the like, drying the electrode mixture, and subjecting the dried electrode mixture to pressure forming, an anode electrode material containing the hardly graphitizable carbonaceous material according to the present invention can be produced. By the use of the hardly graphitizable carbonaceous material according to the present invention, in particular, without the need for adding a conductive additive, an electrode having high electrical conductivity can be produced. However, in order to impart the electrode with higher electrical conductivity, at the time of preparing an electrode mixture, a conductive additive can also be added to the electrode mixture, as necessary.

As the conductive additive, conductive carbon black, a vapor-grown carbon fiber (VGCF), a nanotube, and the like can be used. Although the addition amount of a conductive additive varies with the kind of the conductive additive used, the addition amount thereof preferably falls within the range of 0.5 to 10% by mass (in this context, the equation: the active material (hardly graphitizable carbonaceous material) amount+the binding agent amount+the conductive additive amount=100% by mass holds), more preferably falls within the range of 0.5 to 7% by mass, and especially preferably falls within the range of 0.5 to 5% by mass. By making the addition amount of a conductive additive fall within the above-mentioned range, without deteriorating the dispersion state of the conductive additive in an electrode mixture, expected high-level electrical conductivity can be attained.

No particular limitation is put on the binding agent added as long as the binding agent does not react with an electrolytic solution. Examples thereof can include PVDF (polyvinylidene fluoride), polytetrafluoroethylene, a mixture of SBR (styrene-butadiene-rubber) and CMC (carboxymethyl cellulose), and the like. Of these, PVDF is preferred because PVDF adhered to the active material surface hardly impedes the transfer of lithium ions and satisfactory input-output characteristics are attained. Although the addition amount of a binding agent varies with the kind of the binding agent used, with regard to a PVDF-based binding agent, the addition amount thereof preferably falls within the range of 3 to 13% by mass and more preferably falls within the range of 3 to 10% by mass on the basis of the whole mass of the hardly graphitizable carbonaceous material, the binding agent, and the conductive additive. By making the addition amount of a binding agent fall within the above-mentioned range, problems that the electrical resistance of the resulting electrode becomes large, the internal resistance of a battery becomes large, the battery characteristics are lowered, and the electrical connection between two anode material particles and between an anode material particle and a current collecting plate becomes insufficient can be avoided.

For the purpose of dissolving PVDF in a solvent to prepare slurry, as the solvent, a polar solvent such as N-methylpyrrolidone (NMP) may be preferably used. Moreover, for the purpose of preparing an aqueous emulsion of SBR and the like or an aqueous solution of CMC and the like, as the solvent, water may be preferably used. As the binding agent to be blended with water as a solvent, a mixture of plural binding agents such as a mixture of SBR and CMC is often used. The addition amount of a solvent preferably falls within the range of 0.5 to 5% by mass and more preferably falls within the range of 1 to 4% by mass on the basis of the whole mass of the binding agent used.

Although, basically, electrode active material layers are respectively formed on both faces of a current collecting plate, as necessary, one electrode active material layer may be formed only on one face thereof. The thickness of the active material layer (per one face) preferably falls within the range of 10 to 80 μm, more preferably falls within the range of 20 to 75 μm, and especially preferably falls within the range of 20 to 60 μm. By making the thickness fall within the above-mentioned range, while highly enhanced capacity can be realized because the volume of a current collecting plate, a separator, and the like can be reduced, high input-output characteristics can be attained because a wide electrode area opposed to the counter electrode can be secured.

<Nonaqueous Electrolyte Secondary Battery>

The nonaqueous electrolyte secondary battery according to the present invention comprises the negative electrode material for nonaqueous electrolyte secondary batteries according to the present invention. A nonaqueous electrolyte secondary battery which is produced with a negative electrode material for nonaqueous electrolyte secondary batteries comprising the hardly graphitizable carbonaceous material according to the present invention and which is fully charged to be used shows not only high charge capacity but also high charge-discharge efficiency.

In the case of using the hardly graphitizable carbonaceous material according to the present invention to form a negative electrode material for nonaqueous electrolyte secondary batteries, no particular limitation is put on other constituent materials for a battery such as a positive electrode material, a separator, and an electrolytic solution. It is possible to use various materials which are used in or proposed for a conventional nonaqueous solvent secondary battery.

For example, as the positive electrode material, layered oxide-based composite metal chalcogen compounds (represented by $LiMO_2$, wherein M represents a metallic element: for example, $LiCoO_2$, $LiNiO_2$, $LiMnO_2$, or $LiNi_xCo_yMo_zO_2$ (wherein, x, y, and z each represent a composition ratio)), olivine-based composite metal chalcogen compounds (represented by $LiMPO_4$, wherein M represents a metallic element: for example, $LiFePO_4$ or the like), and spinel-based composite metal chalcogen compounds (represented by $LiM_2O_4$, wherein M represents a metallic element: for example, $LiMn_2O_4$ or the like) are preferred. These chalcogen compounds may be mixed as necessary. These positive electrode materials, together with an appropriate binder and a carbon material that imparts electrical conductivity to the electrode, are molded and formed into a layer on an electrically conductive current collecting member to form a positive electrode.

A nonaqueous solvent type electrolytic solution combined with these positive and negative electrodes to be used is generally formed by dissolving an electrolyte in a nonaqueous solvent. As the nonaqueous solvent, for example, one of organic solvents such as propylene carbonate, ethylene carbonate, dimethyl carbonate, diethyl carbonate, dimethoxyethane, diethoxyethane, γ-butyrolactone, tetrahydrofuran, 2-methyltetrahydrofuran, sulfolane, and 1,3-dioxolane can be used alone or two or more thereof can be used in combination. Moreover, as the electrolyte. $LiClO_4$, $LiPF_6$, $LiBF_4$, $LiCF_3SO_3$, $LiAsF_6$, LiCl, LiBr, $LiB(CCH)_4$, $LiN(SO_3CF_3)_2$, or the like may be used.

In general, a nonaqueous electrolyte secondary battery is produced by opposing the positive electrode and the negative electrode which are formed as described above, as necessary with a liquid-permeable separator, composed of nonwoven fabric and other porous materials, interposed therebetween, and by immersing them in an electrolytic solution. As the separator, a permeable separator, composed of nonwoven fabric and other porous materials, generally used in a secondary battery can be used. Alternatively, instead of the separator or together with the separator, a solid electrolyte composed of a polymer gel impregnated with an electrolytic solution can be used.

In the present specification, "a nonaqueous electrolyte secondary battery fully charged to be used" refers to a nonaqueous electrolyte secondary battery obtained by assembling the nonaqueous electrolyte secondary battery according to the present invention, and allowing its negative electrode to be charged (doped) with lithium until just before precipitation of metallic lithium is confirmed by $^7Li$ nuclear-solid state NMR analysis; and usually means a nonaqueous electrolyte secondary battery charged at a constant current value so as to have a charge capacity within the range of 580 to 700 mAh/g per mass of the negative electrode active material.

<Oxygen Element Content>

In the nonaqueous electrolyte secondary battery according to the present invention, it is good to make the oxygen element content of the hardly graphitizable carbonaceous material smaller. An analysis value thereof obtained by elemental analysis is usually 0.25% by mass or less and preferably 0.24% by mass or less. It is further preferred that the hardly graphitizable carbonaceous material contains substantially no oxygen element. In this context, containing substantially no oxygen element means having an oxygen element content equal to or less than $10^{-6}$% by mass which is a detection limit of the elemental analysis method (inert gas fusion-thermal conductivity method) described below. As described above, when the oxygen element content is the above-mentioned value or less, the lowering in utilization efficiency of lithium ions can be suppressed.

Moreover, as described above, a method of adjusting the oxygen element content is not limited at all. For example, by subjecting a carbon precursor originating from plants to an acid treatment at a predetermined temperature, then, mixing an acid-treated carbon precursor with a volatile organic substance, and calcining the mixture under an inert gas atmosphere at a temperature of 1100° C. to 1400° C., the oxygen element content can be adjusted. The details of the measurement of the oxygen element content are as described in EXAMPLES.

<Main Resonance Peak Position of Chemical Shift Value>

When a hardly graphitizable carbonaceous material in the nonaqueous electrolyte secondary battery according to the present invention is taken out of the nonaqueous electrolyte secondary battery charged (doped) with lithium until a fully charged state thereof is attained, a main resonance peak position of a chemical shift value observed by subjecting the hardly graphitizable carbonaceous material to $^7Li$ nuclear-solid state NMR analysis is preferably downfield by more than 115 ppm, more preferably downfield by more than 118 ppm, and especially preferably downfield by more than 120 ppm, from a peak position of lithium chloride. The details of the 7Li nuclear-solid state NMR analysis are as described in EXAMPLES.

As described above, a battery prepared with a hardly graphitizable carbonaceous material in which a main resonance peak position of a chemical shift value is downfield by more than 115 ppm from a peak position of lithium chloride means a battery having a high charge capacity and having high charge-discharge efficiency calculated from "the discharge capacity/the charge capacity". Since the charge-discharge efficiency is high, the battery becomes advantageous from an aspect of capacity per volume of the battery or cost of the battery. By the use of a carbonaceous material having a main resonance peak position of a chemical shift value which is downfield by less than 115 ppm from a peak position of lithium chloride, unlike the hardly graphitizable carbonaceous material according to the present invention, it is very difficult to achieve both extremely high charge capacity and extremely high charge-discharge efficiency.

<Carbon Precursor>

As described above, the hardly graphitizable carbonaceous material in the nonaqueous electrolyte secondary battery according to the present invention is derived from a phenol resin, a furan resin, pitch, tar, a carbon precursor originating from plants, or the like.

The hardly graphitizable carbonaceous material is preferably derived from a carbon precursor originating from plants. In the present invention, "a carbon precursor originating from plants" means a substance before carbonization originating from plants or a substance after carbonization originating from plants (char derived from plants). As described above, the plant raw material is not particularly limited. Such plants described above can be used singly or in combination of two or more thereof. Of these, coconut shell, which is easily available abundantly, is preferred.

The coconut shell is not particularly limited. The coconut shells exemplified above can be used singly or in combination. Coconut shells of coco palm and palm coconut, which are utilized as foodstuffs, raw material of a detergent, raw material of a biodiesel fuel oil, and the like and are biomass wastes generated in large quantities, are especially preferred.

A method of carbonizing the plant raw material, that is, a method of producing the char derived from plants, is not particularly limited. The method can be performed, for example, by subjecting the plant raw material to a heat treatment under an inert gas atmosphere at 300° C. or more (hereinafter, sometimes referred to as "temporary calcination").

Moreover, the plant raw material in the form of char (for example, coconut shell char) is also available.

<Average Face-to-Face Dimension $d_{002}$>

The average face-to-face dimension $d_{002}$ of the (002) face calculated from the Bragg equation by a wide angle X-ray diffraction method of the hardly graphitizable carbonaceous material in the nonaqueous electrolyte secondary battery according to the present invention preferably falls within the range of 0.36 nm to 0.42 nm, more preferably falls within the range of 0.38 nm to 0.40 nm, and especially preferably falls within the range of 0.381 nm to 0.389 nm. As described above, when the average face-to-face dimension $d_{002}$ of the (002) face falls within the above-mentioned range, the lowering in input-output characteristics of a lithium ion battery can be suppressed, the lowering in stability of a battery material can be suppressed, and the lowering in effective capacity per volume can be avoided. In order to adjust the average face-to-face dimension within the above-mentioned range, for example, a carbon precursor giving a hardly graphitizable carbonaceous material may be calcined at a calcination temperature within the range of 1100 to 1400° C. Moreover, a method in which a carbon precursor is mixed with a thermally-decomposable resin such as polystyrene to be calcined can also be adopted. The details of the measurement of the average face-to-face dimension $d_{002}$ are as described in EXAMPLES.

<Specific Surface Area>

The specific surface area determined by a nitrogen adsorption BET three-point method of the hardly graphitizable carbonaceous material in the nonaqueous electrolyte secondary battery according to the present invention preferably falls within the range of 1 to 20 m²/g, more preferably falls within the range of 1.2 to 10 m²/g, and especially preferably falls within the range of 1.4 to 9.5 m²/g. As described above, when the specific surface area falls within the above-mentioned range, the number of micropores in the hardly graphitizable carbonaceous material can be sufficiently reduced by a calcination step described below, the moisture-absorption characteristics of the hardly graphitizable carbonaceous material can be sufficiently lowered, and the lowering in utilization efficiency of lithium ions can be suppressed. The specific surface area can be adjusted by controlling the temperature in a demineralization step described below. The details of the measurement of the specific surface area by a nitrogen adsorption BET three-point method are as described in EXAMPLES.

<True Density $\rho_{Bt}$>

From the viewpoint of making the capacity per mass of the battery high, the true density by a butanol method of the hardly graphitizable carbonaceous material in the nonaqueous electrolyte secondary battery according to the present invention preferably falls within the range of 1.40 to 1.70 g/cm³, more preferably falls within the range of 1.42 to 1.65 g/cm³, and especially preferably falls within the range of 1.44 to 1.60 g/cm³. The true density within the above-mentioned range can be attained, for example, by setting the calcination step temperature to 1100 to 1400° C. The details of the measurement of the true density $\rho_{Bt}$ are as described in EXAMPLES.

<Potassium Element Content and Iron Element Content>

As described above, the potassium element content of the hardly graphitizable carbonaceous material in the nonaqueous electrolyte secondary battery according to the present invention is preferably 0.1% by mass or less, more preferably 0.05% by mass or less, and further preferably 0.03% by mass or less, and it is especially preferred that the hardly graphitizable carbonaceous material contains substantially no potassium element. Moreover, as described above, the iron element content of the hardly graphitizable carbonaceous material in the nonaqueous electrolyte secondary battery according to the present invention is preferably 0.02% by mass or less, more preferably 0.015% by mass or less, and further preferably 0.01% by mass or less, and it is especially preferred that the hardly graphitizable carbonaceous material contains substantially no iron element. In this context, containing substantially no potassium element or substantially no iron element means having a potassium element content or an iron element content equal to or less than the detection limit value in the X-ray fluorescence analysis (for example, analysis using the "LAB CENTER XRF-1700" available from SHIMADZU CORPORATION) described below. As described above, when the potassium element content and the iron element content are equal to or less than the above-mentioned values, respectively, a sufficient dedoping capacity and a satisfactory nondedoping capacity can be attained and a safety problem of the nonaqueous electrolyte secondary battery can be avoided. The details of the measurement of the potassium element content and iron element content are as described in EXAMPLES.

<Moisture Content>

The moisture content of the hardly graphitizable carbonaceous material in the nonaqueous electrolyte secondary battery according to the present invention is preferably 10000 ppm or less, more preferably 9000 ppm or less, and especially preferably 8000 ppm or less. As described above, the smaller the moisture content, the number of lithium ions that adsorb to the hardly graphitizable carbonaceous material is increased and self-discharge caused by a reaction of lithium ions with adsorbed water can be reduced, which is preferable. The moisture content of the hardly graphitizable carbonaceous material can be reduced, for example, by reducing the number of oxygen atoms contained in a hardly graphitizable carbonaceous material. The moisture content of the hardly graphitizable carbonaceous material can be measured, for example, with the use of a Karl Fischer moisture meter or the like. The details of the measurement of the moisture content are as described in EXAMPLES.

EXAMPLES

Hereinafter, the present invention will be described in detail by reference to examples, but these should not be construed to limit the scope of the present invention. In this connection, measuring methods for physical property values of a hardly graphitizable carbonaceous material will be described below, but physical property values, including values in examples, described in the present specification are based on values determined by the following methods.

<Elemental Analysis>

With the use of "Oxygen/Nitrogen/Hydrogen Analyzer EMGA-930" available from HORIBA. Ltd., elemental analysis was performed.

In this apparatus, as detection methods, an Oxygen: inert gas fusion-Non Dispersive Infrared Ray absorption method (NDIR), a Nitrogen: inert gas fusion-Thermal Conductivity Detection method (TCD), and a Hydrogen: inert gas fusion-Non Dispersive Infrared Ray absorption method (NDI R) were adopted. The calibration was performed by the use of an (Oxygen/Nitrogen) Ni capsule, $TiH_2$ (H standard sample), and SS-3 (N, O standard sample). The water content of a sample was measured at 250° C. for about 10 minutes as a pretreatment, and then, 20 mg of the sample was placed in the Ni capsule, subjected to a degasification for 30 seconds in the elemental analyzer, and analyzed for the elemental analysis. In a test, three specimens were analyzed and an average value thereof was defined as an analysis value.

<$^7$Li Nuclear-Solid State NMR Analysis>

A negative electrode portion containing a hardly graphitizable carbonaceous material fully doped with lithium ions was taken out of a cell in a fully charged state, and the whole negative electrode portion from which the electrolyte was wiped off was placed into a sample tube for NMR. With the use of "Nuclear magnetic resonance apparatus AVANCE 300" available from Bruker Corporation, $^7$Li nuclear-solid state NMR analysis was performed. At the time of measurement, lithium chloride was adopted as a reference material and the peak position thereof was set to 0 ppm.

<Measurement of Average Face-to-Face Dimension $d_{002}$ of (002) Face>

With the use of "MiniFlex II" available from Rigaku Corporation, hardly graphitizable carbonaceous material powder was placed into a sample holder and a CuKα ray which was made monochromatic by a Ni filter was adopted as the radiation source to obtain an X-ray diffraction pattern. A peak position in the diffraction pattern was determined by a centroid method (a method in which a centroid position of the diffraction pattern is determined and a 2θ value corresponding thereto is calculated to determine a peak position) and corrected by the use of a diffraction peak of the (111) face of high purity silicon powder for standard reference materials. The wavelength of the CuKα ray was defined as 0.15418 nm to calculate $d_{002}$ according to the Bragg's formula mentioned below.

$$d_{002} = \frac{\lambda}{2 \cdot \sin\theta} \text{ (Bragg's formula)} \quad \text{[Mathematical 2]}$$

<Measurement of Specific Surface Area by Nitrogen Adsorption BET Three-Point Method>

An approximate equation derived from the BET equation is mentioned below.

$$p/[v(p_0-p)]=(1/v_m c)+[(c-1)/v_m c](p/p_0) \quad \text{[Mathematical 3]}$$

With the use of the above-mentioned approximate equation, $v_m$ was determined by a three-point method utilizing nitrogen adsorption at a liquid nitrogen temperature to calculate the specific surface area of a sample according to the following equation.

$$\text{Specific surface area} = \left(\frac{v_m N a}{22400}\right) \times 10^{-18} \quad \text{[Mathematical 4]}$$

In this context, $v_m$ represents an adsorption amount ($cm^3$/g) required for a monomolecular layer to be formed on the sample surface, v represents an actually measured adsorption amount ($cm^3$/g), $p_0$ represents a saturated vapor pressure, p represents an absolute pressure, c represents a constant (reflecting the heat of adsorption), N represents Avogadro's number $6.022 \times 10^{23}$, and a ($nm^2$) represents an area occupied by molecules of the adsorbate on the sample surface (molecular sectional area at the monolayer).

Specifically, with the use of "BELL Sorb Mini" available from MicrotracBEL Corp., the amount of nitrogen adsorbed to a hardly graphitizable carbonaceous material at a liquid nitrogen temperature was measured in the following way. A pulverized hardly graphitizable carbonaceous material with a particle diameter of about 5 to 50 μm was placed in a sample tube, the internal pressure of the sample tube in a state of being cooled to −196° C. was once reduced, and then, the hardly graphitizable carbonaceous material was made to adsorb nitrogen (purity of 99.999%) at a desired relative pressure. The amount of nitrogen adsorbed to a sample when the adsorption equilibrium is attained at each desired relative pressure was defined as the adsorption gas amount v.

<Measurement of True Density $\rho_{Bt}$ by Butanol Method>

According to a method stipulated in JIS R 7212, the true density was measured by a butanol method. A specific gravity bottle with a side tube having an internal volume of about 40 mL was accurately weighed for the mass ($m_1$). Next, a sample was placed into the bottle so that the sample flattened all over a bottom part of the bottle and the thickness of the sample becomes about 10 mm, after which the specific gravity bottle was accurately weighed for the mass ($m_2$). To this, 1-butanol was carefully added so that a depth from the bottom to the liquid level of 1-butanol became 20 mm or so. Next, weak vibrations were applied to the specific gravity bottle and it was confirmed that no more large air bubble was generated, after which the specific gravity bottle was placed in a vacuum desiccator and the inside of the vacuum desiccator was gradually evacuated to a degree of 2.0 to 2.7 kPa. After the degree of evacuation was kept for 20 minutes or more and the generation of air bubbles stopped, the specific gravity bottle was taken out of the vacuum desiccator. The specific gravity bottle was filled with 1-butanol, stoppered, and immersed for 15 minutes or more in a constant-temperature water bath (the temperature was adjusted to 30±0.03° C.) to make the liquid level of 1-butanol coincide with the marked line. Next, the specific gravity bottle was taken out thereof, the outside surface was thoroughly wiped, and the contents were cooled to room temperature, after which the specific gravity bottle was accurately weighed for the mass ($m_4$). Next, the identical specific gravity bottle was filled only with 1-butanol and immersed in a constant-temperature water bath in the same manner as above to make the liquid level of 1-butanol coincide with the marked line, after which the specific gravity bottle was weighed for the mass ($m_3$). Moreover, the identical specific gravity bottle was filled only with distilled water prepared by being boiled just before use to remove dissolved gas and immersed in a constant-temperature water bath in the same manner as above to make the liquid level of distilled water coincide with the marked line, after which the specific gravity bottle was weighed for the mass ($m_5$).

The true density $\rho_{Bt}$ was calculated according to the following equation.

$$\rho_{Bt} = \frac{m_2 - m_1}{m_2 - m_1 - (m_4 - m_3)} \times \frac{m_3 - m_1}{m_5 - m_1} d \qquad \text{[Mathematical 5]}$$

In this context, d represents the specific gravity (0.9946) of water at 30° C.

<Measurement of Metallic Element Content>

The potassium element content and the iron element content were measured in the following manner. Carbon samples containing predetermined amounts of the potassium element and the iron element were prepared beforehand, and with the use of an X-ray fluorescence spectroscopic analyzer, a calibration curve showing the relationship between the intensity of the potassium Kα ray and the potassium element content and a calibration curve showing the relationship between the intensity of the iron Kα ray and the iron element content were prepared. Then, a sample was measured for the intensities of the potassium Kα ray and the iron Kα ray in X-ray fluorescence analysis to determine the potassium element content and the iron element content by the use of the previously prepared calibration curves. With the use of "LAB CENTER XRF-1700" available from SHIMADZU CORPORATION, the X-ray fluorescence analysis was performed under the following condition. A holder for the upper part irradiation system was used and the measurement area of the sample was set within the circumference of a diameter of 20 mm. With regard to the installation of a sample to be measured, 0.5 g of the sample to be measured was placed in a polyethylene-made vessel with an inner diameter of 25 mm, the back side of the vessel was supported with a plankton net, and the measurement surface was covered with a polypropylene-made film to perform the measurement. Conditions of an X-ray source were set to 40 kV and 60 mA. With regard to potassium, LiF (200) was used as the dispersive crystal, a gas flow type proportional counter was used as a detector, and the sample was measured at a scanning speed of 8°/minute within the range of 90 to 140° as the value of 2θ. With regard to iron, LiF (200) was used as the dispersive crystal, a scintillation counter was used as a detector, and the sample was measured at a scanning speed of 8°/minute within the range of 56 to 60° as the value of 2θ.

<Measurement of Moisture Content>

Ten grams of a pulverized hardly graphitizable carbonaceous material with a particle diameter of about 5 to 50 μm was placed in a sample tube, pre-dried for 2 hours at 120° C. under a reduced pressure of 133 Pa, transferred to a glass-made petri dish of 50 mmΦ, and allowed to stand in a constant-temperature and constant-humidity chamber at a temperature of 25° C. and a humidity of 50% for a predetermined period of time. One gram of the sample was taken out, and with the use of the Karl Fischer Moisture Meter (available from Mitsubishi Chemical Analytech Co., Ltd.), the sample was heated to 250° C. and measured for the water content under a stream of nitrogen.

Example 1 (Liquid Phase Demineralization, Half-Cell Evaluation)

<Preparation of Carbon Precursor>

In 150 g of a 7.4% by mass aqueous citric acid solution, 100 g of coconut shell chips of about 5 mm square from Mindanao Island in the Philippines was immersed. The coconut shell in the solution was heated to 80° C., heated for 4 hours, cooled to room temperature, and subjected to filtration to remove the filtrate. A series of this operation was performed five times to perform demineralization. The demineralized coconut shell was dried for 24 hours at 80° C. under a vacuum of 1 Torr. In a crucible, 20 g of the coconut shell chips thus demineralized was placed. With the use of the KTF1100 Furnace (inner diameter of 70 mmΦ) available from Koyo Thermo Systems Co., Ltd., under a stream of nitrogen with an oxygen content of 15 ppm at a flow rate of 3 L/minute (0.012 meter/second), the temperature of the crucible was elevated to 500° C. at 10° C./minute, maintained for 60 minutes, and then, cooled over a period of 6 hours. The crucible was taken out thereof at 50° C. or less to obtain a carbonized product.

The obtained carbonized product was coarsely pulverized so as to have an average particle diameter of 10 μm using a ball mill, and then, pulverized using a compact jet mill (available from SEISHIN ENTERPRISE Co., Ltd., Co-Jet system α·mk III) and classified to obtain a carbon precursor with an average particle diameter of 9.0 μm.

<Preparation of Hardly Graphitizable Carbonaceous Material>

Nine point one grams of the carbon precursor prepared as above and 0.9 g of polystyrene (available from SEKISUI PLASTICS CO., Ltd., the average particle diameter of 400 μm, the residual carbon ratio of 1.2%) were mixed. In a graphite-made sheath (100 mm long, 100 mm wide, and 50 mm high), 10 g of this mixture was placed. The temperature of the graphite-made sheath was elevated to 1270° C. at a temperature increasing rate of 60° C. per minute under a stream of nitrogen at a flow rate of 5 L per minute in a high-speed temperature rising furnace available from MOTOYAMA K.K., and then, maintained for 11 minutes, and allowed to spontaneously cool. After the drop of the internal temperature of the furnace to 200° C. or less was confirmed, a hardly graphitizable carbonaceous material was taken out of the furnace. The amount of the recovered hardly graphitizable carbonaceous material was determined to be 7.3 g, and the recovery rate from the carbon precursor was determined to be 80%.

<Half-Cell Evaluation>

Ninety four parts by mass of the hardly graphitizable carbonaceous material prepared as above, 6 parts by mass of PVDF (polyvinylidene fluoride), and 90 parts by mass of NMP (N-methylpyrrolidone) were mixed to obtain slurry. The obtained slurry was applied onto a sheet of copper foil with a thickness of 14 μm, dried, and then, pressed to obtain an electrode with a thickness of 60 to 70 μm. The obtained electrode was determined to have a density of 0.9 to 1.1 g/cm³.

The electrode corresponding to a negative electrode was used as a working electrode and metallic lithium was used as a counter electrode and a reference electrode. Ethylene carbonate and methylethyl carbonate were mixed at a volume ratio of 3:7, and the obtained mixture was used as a solvent. In this solvent, $LiPF_6$ was dissolved at a concentration of 1 mol/L, and the obtained solution was used as an electrolyte. A sheet of glass fiber nonwoven fabric was used as a separator. In a glove box, a coin cell was prepared under an argon atmosphere.

With the use of a charge-discharge testing device ("TOSCAT" available from TOYO SYSTEM CO., LTD.), an anode half cell of the above-mentioned constitution was subjected to a charge-discharge test. Lithium doping was performed at a rate of 30 mA/g relative to the mass of the active material until a predetermined capacity (580 to 700 mAh/g), at which no metallic lithium was precipitated, was attained, and the doping was completed. The capacity (mAh/g) attained at this time was defined as the charge capacity.

Then, dedoping was performed at a rate of 30 mA/g relative to the mass of the active material until the potential becomes 1.5 V relative to the lithium potential, and the capacity discharged at this time was defined as the discharge capacity. The percentage of the discharge capacity/the charge capacity was defined as the charge-discharge efficiency (initial charge-discharge efficiency) and defined as an index of the utilization efficiency of lithium ions in a battery. In this context, "a predetermined capacity at which no metallic lithium was precipitated" refers to an upper limit charge capacity (mAh/g) at which no precipitation of metallic lithium was observed by Li-NMR.

The hardly graphitizable carbonaceous material was subjected to 7Li nuclear-solid state NMR analysis, and measured for the oxygen element content, the average face-to-face dimension $d_{002}$ of the (002) face, the specific surface area, the true density, the potassium element content and iron element content, and the moisture content. The results are collected in Table 1 and the $^7$Li nuclear-solid state NMR spectrum is shown in FIG. 1.

Example 2 (Vapor Phase Demineralization, Half-Cell Evaluation)

<Preparation of Carbon Precursor>

Coconut shell was crushed and dry-distilled at 500° C. to obtain coconut shell char with a particle diameter of 2.36 to 0.85 mm. While nitrogen gas containing hydrogen chloride gas in a content of 1% by volume was supplied at a flow rate of 10 L/minute to 100 g of the coconut shell char, the coconut shell char was subjected to a halogen heat treatment for 30 minutes at 870° C. Afterward, only the supply of hydrogen chloride gas was stopped. While nitrogen gas was supplied at a flow rate of 10 L/minute thereto, the coconut shell char was subjected to a vapor phase deacidification treatment for 30 minutes at 900° C. to obtain a carbon precursor.

The obtained carbon precursor was coarsely pulverized so as to have an average particle diameter of 10 μm using a ball mill, and then, pulverized using a compact jet mill (available from SEISHIN ENTERPRISE Co., Ltd., Co-Jet system α·mk III), and classified to obtain a carbon precursor with an average particle diameter of 9.6 μm.

<Preparation of Hardly Graphitizable Carbonaceous Material>

Nine point one grams of the carbon precursor prepared as above and 0.9 g of polystyrene (available from SEKISUI PLASTICS CO., Ltd., the average particle diameter of 400 μm, the residual carbon ratio of 1.2%) were mixed. In a graphite-made sheath (100 mm long, 100 mm wide, and 50 mm high), 10 g of this mixture was placed. The temperature of the graphite-made sheath was elevated to 1320° C. at a temperature increasing rate of 60° C. per minute under a stream of nitrogen at a flow rate of 5 L per minute in a high-speed temperature rising furnace available from MOTOYAMA K.K., and then, maintained for 11 minutes, and allowed to spontaneously cool. After the drop of the internal temperature of the furnace to 200° C. or less was confirmed, a hardly graphitizable carbonaceous material was taken out of the furnace. The amount of the recovered hardly graphitizable carbonaceous material was determined to be 8.1 g, and the recovery rate from the carbon precursor was determined to be 89%.

<Half-Cell Evaluation>

Ninety four parts by mass of the hardly graphitizable carbonaceous material prepared as above, 6 parts by mass of PVDF (polyvinylidene fluoride), and 90 parts by mass of NMP (N-methylpyrrolidone) were mixed to obtain slurry. The obtained slurry was applied onto a sheet of copper foil with a thickness of 14 μm, dried, and then, pressed to obtain an electrode with a thickness of 60 to 70 μm. The obtained electrode was determined to have a density of 0.9 to 1.1 g/cm$^3$.

The electrode corresponding to a negative electrode was used as a working electrode, and metallic lithium was used as a counter electrode and a reference electrode. Ethylene carbonate and methylethyl carbonate were mixed at a volume ratio of 3:7, and the obtained mixture was used as a solvent. LiPF$_6$ was dissolved at a concentration of 1 mol/L in this solvent, and the obtained solution was used as an electrolyte. A sheet of glass fiber nonwoven fabric was used as a separator. In a glove box, a coin cell was prepared under an argon atmosphere.

With the use of a charge-discharge testing device ("TOSCAT" available from TOYO SYSTEM CO., LTD.), an anode half cell of the above-mentioned constitution was subjected to a charge-discharge test. Lithium doping was performed at a rate of 30 mA/g relative to the mass of the active material until a predetermined capacity (580 to 700 mAh/g), at which no metallic lithium was precipitated, was attained, and the doping was completed. The capacity (mAh/g) attained at this time was defined as the charge capacity. Then, dedoping was performed at a rate of 30 mA/g relative to the mass of the active material until the potential becomes 1.5 V relative to the lithium potential, and the capacity discharged at this time was defined as the discharge capacity. The percentage of the discharge capacity/the charge capacity was defined as the charge-discharge efficiency (initial charge-discharge efficiency) and defined as an index of the utilization efficiency of lithium ions in a battery. In this context, "a predetermined capacity at which no metallic lithium was precipitated" refers to an upper limit charge capacity (mAh/g) at which no precipitation of metallic lithium was observed by Li-NMR.

The hardly graphitizable carbonaceous material was subjected to 7Li nuclear-solid state NMR analysis, and measured for the oxygen element content, the average face-to-face dimension $d_{002}$ of the (002) face, the specific surface area, the true density, the potassium element content and iron element content, and the moisture content.

Example 3 (Vapor Phase Demineralization, Full-Cell Evaluation)

A hardly graphitizable carbonaceous material and a negative electrode which are similar to those in Example 2 were used to perform the following full-cell evaluation.

<Full-Cell Evaluation>

A negative electrode similar to that in Example 2 was used.

Preparation of Positive Electrode

Ninety two parts by mass of a ternary oxide (LiNi$_{1/3}$Co$_{1/3}$Mn$_{1/3}$O$_2$) as a positive electrode active material, 3 parts by mass of PVDF (polyvinylidene fluoride), 5 parts by mass of acetylene black, and 120 parts by mass of NMP (N-methylpyrrolidone) were mixed to obtain slurry. The obtained slurry was applied onto a sheet of aluminum foil with a thickness of 20 μm, dried, and then, pressed to obtain an electrode with a thickness of 75 to 85 μm. The obtained electrode was determined to have a density of 2.4 to 2.6 g/cm$^3$. This electrode sheet was punched into a disk-like shape with a diameter of 14 mm to obtain a positive electrode plate.

Preparation of Cathode Half Cell

The obtained electrode was used as a positive electrode and metallic lithium was used as a counter electrode and a reference electrode. Ethylene carbonate and methylethyl carbonate were mixed at a volume ratio of 3:7, and the obtained mixture was used as a solvent. $LiPF_6$ was dissolved at a concentration of 1 mol/L in this solvent, and the obtained solution was used as an electrolyte. A sheet of glass fiber nonwoven fabric was used as a separator. In a glove box, a coin cell was prepared under an argon atmosphere.

With the use of a charge-discharge testing device ("TOSCAT" available from TOYO SYSTEM CO., LTD.), a cathode half cell of the above-mentioned constitution was subjected to a charge-discharge test. Lithium dedoping from the positive electrode was performed at a rate of 15 mA/g relative to the mass of the active material until the potential becomes 4.2 V relative to the lithium potential, and the capacity attained at this time was defined as the charge capacity. Then, lithium doping to the positive electrode was performed at a rate of 15 mA/g relative to the mass of the active material until the potential becomes 3.0 V relative to the lithium potential, and the capacity attained at this time was defined as the discharge capacity. The charge capacity attained and the discharge capacity attained were determined to be 174 mAh/g and 154 mAh/g, respectively, and the charge-discharge efficiency (initial charge-discharge efficiency) calculated as the percentage of the discharge capacity/the charge capacity was determined to be 88.5%.

Preparation of Full Cell and Evaluation

A negative electrode mixture-applied face and a positive electrode mixture-applied face were opposed to each other with a separator composed of glass fiber nonwoven fabric interposed therebetween so that the positive electrode (with a diameter of 14 mm) did not protrude from the negative electrode face area with a diameter of 15 mm obtained in Example 2. On this occasion, a ratio (anode capacity/cathode capacity) of an anode charge capacity (mAh) per opposing area to a cathode charge capacity (mAh) per opposing area was adjusted to be 1. Ethylene carbonate and methylethyl carbonate were mixed at a volume ratio of 3:7, and the obtained mixture was used as a solvent. $LiPF_6$ was dissolved at a concentration of 1 mol/L in this solvent, and the obtained solution was used as an electrolyte. In a glove box, a coin cell was prepared under an argon atmosphere.

Charge-Discharge Test

With the use of a charge-discharge testing device ("TOSCAT" available from TOYO SYSTEM CO., LTD.), a coin cell (full cell) of the above-mentioned constitution was subjected to a charge-discharge test. Charging was performed at a rate of 30 mA/g relative to the mass of the negative electrode active material until the potential becomes 4.2 V relative to the lithium potential, and the capacity attained at this time was defined as the charge capacity. Then, discharging was performed at a rate of 30 mA/g relative to the mass of the negative electrode active material until the potential becomes 2.0 V relative to the lithium potential, and the capacity attained at this time was defined as the discharge capacity.

The hardly graphitizable carbonaceous material was subjected to 7Li nuclear-solid state NMR analysis, and measured for the oxygen element content, the average face-to-face dimension $d_{002}$ of the (002) face, the specific surface area, the true density, the potassium element content and iron element content, and the moisture content. The results are collected in Table 1.

Comparative Example 1 (Half-Cell Evaluation)

<Preparation of Carbon Precursor>

In a crucible, 100 g of coconut shell chips of about 5 mm square from Mindanao Island in the Philippines was placed. With the use of the KTF1100 Furnace (inner diameter of 70 mmΦ) available from Koyo Thermo Systems Co., Ltd., under a stream of nitrogen with an oxygen content of 15 ppm at a flow rate of 3 L/minute (0.012 meter/second), the temperature of the crucible was elevated to 500° C. at 10° C./minute, maintained for 60 minutes, and then, cooled over a period of 6 hours. The crucible was taken out thereof at 50° C. or less to obtain a carbonized product.

The obtained carbonized product was coarsely pulverized so as to have an average particle diameter of 10 μm using a ball mill, and then, pulverized using a compact jet mill (available from SEISHIN ENTERPRISE Co., Ltd., Co-Jet system α·mk III) and classified to obtain a carbon precursor with an average particle diameter of 9.0 μm.

The operation, in which 20 g of the carbon precursor thus obtained was immersed for 1 hour in 100 g of a 35% by mass aqueous hydrochloric acid solution and then washed for 1 hour with water at 80° C., was performed two times to perform demineralization. The demineralized coconut shell was dried for 24 hours at 80° C. under a vacuum of 1 Torr.

<Preparation of Hardly Graphitizable Carbonaceous Material>

Nine point one grams of the carbon precursor prepared as above and 0.9 g of polystyrene (available from SEKISUI PLASTICS CO., Ltd., the average particle diameter of 400 μm, the residual carbon ratio of 1.2%) were mixed. In a graphite-made sheath (100 mm long, 100 mm wide, and 50 mm high), 10 g of this mixture was placed. The temperature of the graphite-made sheath was elevated to 1270° C. at a temperature increasing rate of 60° C. per minute under a stream of nitrogen at a flow rate of 5 L per minute in a high-speed temperature rising furnace available from MOTOYAMA K.K., and then, maintained for 11 minutes, and allowed to spontaneously cool. After the drop of the internal temperature of the furnace to 200° C. or less was confirmed, a hardly graphitizable carbonaceous material was taken out of the furnace. The amount of the recovered hardly graphitizable carbonaceous material was determined to be 7.6 g and the recovery rate from the carbon precursor was determined to be 84%.

<Half-Cell Evaluation>

Ninety four parts by mass of the hardly graphitizable carbonaceous material prepared as above, 6 parts by mass of PVDF (polyvinylidene fluoride), and 90 parts by mass of NMP (N-methylpyrrolidone) were mixed to obtain slurry. The obtained slurry was applied onto a sheet of copper foil with a thickness of 14 μm, dried, and then, pressed to obtain an electrode with a thickness of 60 to 70 μm. The obtained electrode was determined to have a density of 0.9 to 1.1 g/cm³.

The electrode corresponding to a negative electrode was used as a working electrode, and metallic lithium was used as a counter electrode and a reference electrode. Ethylene carbonate and methylethyl carbonate were mixed at a volume ratio of 3:7, and the obtained mixture was used as a solvent. $LiPF_6$ was dissolved at a concentration of 1 mol/L in this solvent, and the obtained solution was used as an electrolyte. A sheet of glass fiber nonwoven fabric was used as a separator. In a glove box, a coin cell was prepared under an argon atmosphere.

With the use of a charge-discharge testing device ("TOSCAT" available from TOYO SYSTEM CO., LTD.), an anode half cell of the above-mentioned constitution was subjected to a charge-discharge test. Lithium doping was performed at a rate of 30 mA/g relative to the mass of the active material until a predetermined capacity (450 to 600 mAh/g), at which no metallic lithium was precipitated, was attained, and the doping was completed. The capacity (mAh/g) attained at this time was defined as the charge capacity. Then, dedoping was performed at a rate of 30 mA/g relative to the mass of the active material until the potential becomes 1.5 V relative to the lithium potential, and the capacity discharged at this time was defined as the discharge capacity. The percentage of the discharge capacity/the charge capacity was defined as the charge-discharge efficiency (initial charge-discharge efficiency) and defined as an index of the utilization efficiency of lithium ions in a battery. In this context, "a predetermined capacity at which no metallic lithium was precipitated" refers to an upper limit charge capacity (mAh/g) at which no precipitation of metallic lithium was observed by Li-NMR.

The hardly graphitizable carbonaceous material was subjected to $^7$Li nuclear-solid state NMR analysis, and measured for the oxygen element content, the average face-to-face dimension $d_{002}$ of the (002) face, the specific surface area, the true density, the potassium element content and iron element content, and the moisture content.

Comparative Example 2 (Half-Cell Evaluation)

<Half-Cell Evaluation>

Ninety four parts by mass of CARBOTRON PJ available from KUREHA CORPORATION, 6 parts by mass of PVDF (polyvinylidene fluoride), and 90 parts by mass of NMP (N-methylpyrrolidone) were mixed to obtain slurry. The obtained slurry was applied onto a sheet of copper foil with a thickness of 14 μm, dried, and then, pressed to obtain an electrode with a thickness of 60 to 70 μm. The obtained electrode was determined to have a density of 0.9 to 1.1 g/cm$^3$.

The electrode corresponding to a negative electrode was used as a working electrode, and metallic lithium was used as a counter electrode and a reference electrode. Ethylene carbonate and methylethyl carbonate were mixed at a volume ratio of 3:7, and the obtained mixture was used as a solvent. LiPF$_6$ was dissolved at a concentration of 1 mol/L in this solvent, and the obtained solution was used as an electrolyte. A sheet of glass fiber nonwoven fabric was used as a separator. In a glove box, a coin cell was prepared under an argon atmosphere.

With the use of a charge-discharge testing device ("TOSCAT" available from TOYO SYSTEM CO., LTD.), an anode half cell of the above-mentioned constitution was subjected to a charge-discharge test. Lithium doping was performed at a rate of 30 mA/g relative to the mass of the active material until a predetermined capacity (450 to 600 mAh/g), at which no metallic lithium was precipitated, was attained, and the doping was completed. The capacity (mAh/g) attained at this time was defined as the charge capacity. Then, dedoping was performed at a rate of 30 mA/g relative to the mass of the active material until the potential becomes 1.5 V relative to the lithium potential, and the capacity discharged at this time was defined as the discharge capacity. The percentage of the discharge capacity/the charge capacity was defined as the charge-discharge efficiency (initial charge-discharge efficiency) and defined as an index of the utilization efficiency of lithium ions in a battery. In this context, "a predetermined capacity at which no metallic lithium was precipitated" refers to an upper limit charge capacity (mAh/g) at which no precipitation of metallic lithium was observed by Li-NMR.

Figure 2:
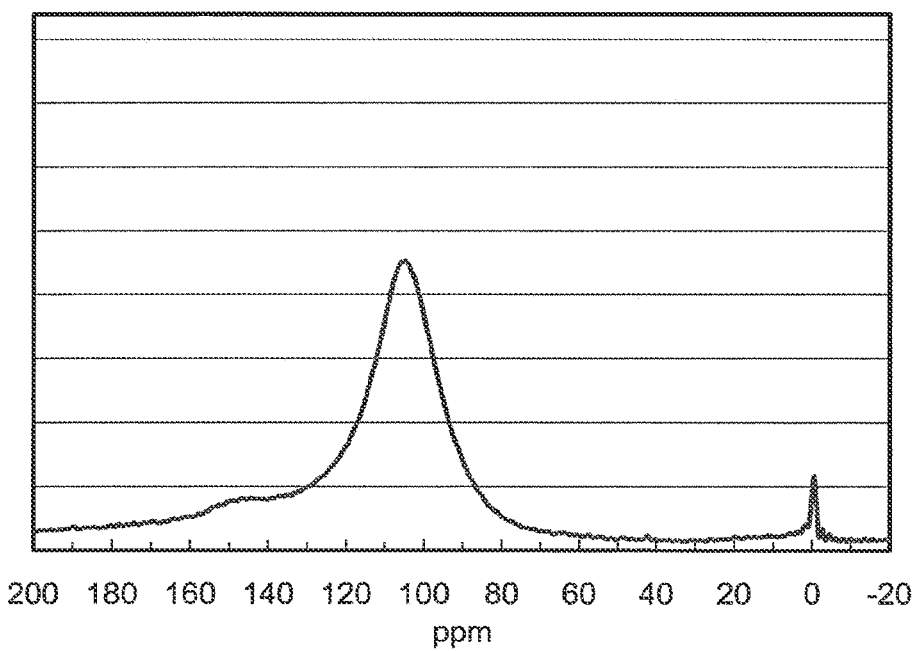
FIG. 2 shows an $^7$Li nuclear-solid state NMR spectrum of the carbonaceous material prepared in Comparative Example 2.

The hardly graphitizable carbonaceous material was subjected to $^7$Li nuclear-solid state NMR analysis, and measured for the oxygen element content, the average face-to-face dimension $d_{002}$ of the (002) face, the specific surface area, the true density, the potassium element content and iron element content, and the moisture content. The results are collected in Table 1 and the $^7$Li nuclear-solid state NMR spectrum is shown in FIG. 2.

TABLE 1

| | | Raw materials | Acid treatment (Demineralization) | Carbonization | Acid treatment (Demineralization) | Calcination | Oxygen element content (% by mass) | Average face-to-face dimension $d_{002}$ (nm) | Specific surface area (m$^2$/g) | True density (g/cm$^3$) |
|---|---|---|---|---|---|---|---|---|---|---|
| Example | 1 | Coconut shell | Liquid phase (Citric acid) | ~500° C. | — | 1270° C. | 0.21 | 0.387 | 5.1 | 1.50 |
| | 2 | Coconut shell | — | ~500° C. | Vapor phase (870° C.) | 1320° C. | 0.11 | 0.389 | 3.8 | 1.47 |
| | 3 | Coconut shell | — | ~500° C. | Vapor phase (870° C.) | 1320° C. | 0.11 | 0.389 | 3.8 | 1.47 |
| Comparative Example | 1 | Coconut shell | — | ~500° C. | 35% by mass HCl | 1270° C. | 0.31 | 0.388 | 13 | 1.48 |
| | 2 | CARBOTRON PJ | — | — | — | — | 0.34 | 0.381 | 4.8 | 1.52 |

| | | Potassium element content (% by mass) | Iron element content (% by mass) | Moisture content (ppm) | Main resonance peak position of chemical shift value (ppm) | Charging (mAh/g) | Discharging (mAh/g) | Irreversible capacity (mAh/g) | Charge-discharge efficiency (%) |
|---|---|---|---|---|---|---|---|---|---|
| Example | 1 | 0.0023 | 0.0020 | 7200 | 123 | 600 | 500 | 100 | 83.3 |
| | 2 | 0.0020 | 0.0018 | 3100 | 126 | 589 | 491 | 98 | 83.4 |
| | 3 | 0.0020 | 0.0018 | 3100 | 122 | 586 | 488 | 98 | 83.3 |
| Comparative Example | 1 | 0.3200 | 0.0240 | 12400 | 107 | 560 | 461 | 99 | 82.3 |
| | 2 | 0.0010 | 0.0012 | 10200 | 105 | 520 | 427 | 93 | 82.1 |

INDUSTRIAL APPLICABILITY

A nonaqueous electrolyte secondary battery comprising the hardly graphitizable carbonaceous material according to the present invention and being fully charged to be used has not only extremely high charge capacity but also extremely high charge-discharge efficiency. Accordingly the nonaqueous electrolyte secondary battery can be used especially in the field of on-vehicle batteries for a vehicle such as a hybrid vehicle (HEV), an electric vehicle (EV), and the like.

The invention claimed is:

1. A method of charging a nonaqueous electrolyte secondary battery, comprising:
charging the nonaqueous electrolyte secondary battery to a fully charged state by charging at a constant current value to the range of 580 to 700 mAh/g per unit mass of the hardly graphitizable carbonaceous material, the nonaqueous electrolyte secondary battery comprising a negative electrode material suitable for nonaqueous electrolyte secondary batteries comprising a hardly graphitizable carbonaceous material,
wherein the hardly graphitizable carbonaceous material has an oxygen element content of 0.25% by mass or less, and
wherein an elemental oxygen content of the hardly graphitizable carbonaceous material is measured by a method comprising inert gas fusion-Non Dispersive Infrared Ray absorption, calibrated using an Ni capsule, by a $TiH_2$ dihydrogen standard and an SS-3 nitrogen-oxygen standard, a water content of each of three samples being measured at 250° C. for 10 minutes as a pretreatment, and then placing 20 mg of each sample into the Ni capsule, degasifying for 30 seconds in an elemental analyzer, and analyzing for an average value of the elemental oxygen content in the samples.

2. The method of claim 1, wherein, when the hardly graphitizable carbonaceous material is taken out of the nonaqueous electrolyte secondary battery in a fully charged state, a main resonance peak position of a chemical shift value of the hardly graphitizable carbonaceous material observed by $^7Li$ nuclear-solid state NMR analysis is downfield by more than 115 ppm from a peak position of lithium chloride.

3. The method of claim 1, wherein the hardly graphitizable carbonaceous material is derived from a carbon precursor originating from plants.

4. The method of claim 1, wherein the hardly graphitizable carbonaceous material has an average face-to-face dimension $d_{002}$ of the (002) face calculated from the Bragg equation by a wide angle X-ray diffraction method in a range of from 0.36 to 0.42 nm.

5. The method of claim 1, wherein the hardly graphitizable carbonaceous material has an average face-to-face dimension $d_{002}$ of the (002) face calculated from the Bragg equation by a wide angle X-ray diffraction method in a range of from 0.38 to 0.40 nm.

6. The method of claim 1, wherein the hardly graphitizable carbonaceous material has an average face-to-face dimension $d_{002}$ of the (002) face calculated from the Bragg equation by a wide angle X-ray diffraction method in a range of from 0.381 to 0.389 nm.

7. The method of claim 1, wherein the hardly graphitizable carbonaceous material has a specific surface area determined by a nitrogen adsorption BET three-point method of 1 to 20 $m^2/g$.

8. The method of claim 1, wherein the hardly graphitizable carbonaceous material has a specific surface area determined by a nitrogen adsorption BET three-point method of 1.2 to 10 $m^2/g$.

9. The method of claim 1, wherein the hardly graphitizable carbonaceous material has a specific surface area determined by a nitrogen adsorption BET three-point method of 1.4 to 9.5 $m^2/g$.

10. The method of claim 1, wherein the hardly graphitizable carbonaceous material has a true density determined by a butanol method of 1.40 to 1.70 $g/cm^3$.

11. The method of claim 1, wherein the hardly graphitizable carbonaceous material has a true density determined by a butanol method of 1.42 to 1.65 $g/cm^3$.

12. The method of claim 1, wherein the hardly graphitizable carbonaceous material has a true density determined by a butanol method of 1.44 to 1.60 $g/cm^3$.

13. The method of claim 1, wherein the hardly graphitizable carbonaceous material has a potassium element content of 0.1% by mass or less and an iron element content of 0.02% by mass or less.

14. The method of claim 1, wherein the oxygen element content of the hardly graphitizable carbonaceous material is 0.24% by mass or less.

15. The method of claim 1, wherein the oxygen element content of the hardly graphitizable carbonaceous material is $10^{-6}$% by mass or less.

16. The method of claim 1, wherein the hardly graphitizable carbonaceous material has
an average face-to-face dimension $d_{002}$ of the (002) face calculated from the Bragg equation by a wide angle X-ray diffraction method in a range of from 0.36 to 0.42 nm,
a specific surface area determined by a nitrogen adsorption BET three-point method of 1 to 20 $m^2/g$, and
a true density determined by a butanol method of 1.40 to 1.70 $g/cm^3$.

17. The method of claim 1, wherein the hardly graphitizable carbonaceous material has
an average face-to-face dimension $d_{002}$ of the (002) face calculated from the Bragg equation by a wide angle X-ray diffraction method in a range of from 0.38 to 0.40 nm,
a specific surface area determined by a nitrogen adsorption BET three-point method of 1.2 to 10 $m^2/g$, and
a true density determined by a butanol method of 1.42 to 1.65 $g/cm^3$.

18. The method of claim 1, wherein the hardly graphitizable carbonaceous material has
an average face-to-face dimension $d_{002}$ of the (002) face calculated from the Bragg equation by a wide angle X-ray diffraction method in a range of from 0.381 to 0.389 nm,
a specific surface area determined by a nitrogen adsorption BET three-point method of 1.4 to 9.5 $m^2/g$, and
a true density determined by a butanol method of 1.44 to 1.60 $g/cm^3$.

19. The method of claim 1, wherein the hardly graphitizable carbonaceous material has
an average face-to-face dimension $d_{002}$ of the (002) face calculated from the Bragg equation by a wide angle X-ray diffraction method in a range of from 0.36 to 0.42 nm,
a specific surface area determined by a nitrogen adsorption BET three-point method of 1 to 20 $m^2/g$,
a true density determined by a butanol method of 1.40 to 1.70 $g/cm^3$,
a potassium element content of 0.1% by mass or less and an iron element content of 0.02% by mass or less, and
an oxygen element content of 0.24% by mass or less.

20. A nonaqueous electrolyte secondary battery, comprising:
a negative electrode material suitable for nonaqueous electrolyte secondary batteries comprising a hardly graphitizable carbonaceous material, wherein the hardly graphitizable carbonaceous material has an oxygen element content of 0.25% by mass or less wherein the nonaqueous electrolyte secondary battery is charged by the method of claim 1 to a fully charged state.

* * * * *